(12) United States Patent
Wada et al.

(10) Patent No.: US 11,831,270 B2
(45) Date of Patent: Nov. 28, 2023

(54) MOTOR DRIVE CONTROL DEVICE, MOTOR UNIT, AND MOTOR DRIVE CONTROL METHOD

(71) Applicant: MINEBEA MITSUMI Inc., Nagano (JP)

(72) Inventors: Naoyuki Wada, Iwata (JP); Atsushi Kikuchi, Oamishirasato (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 17/664,494

(22) Filed: May 23, 2022

(65) Prior Publication Data

US 2022/0385215 A1 Dec. 1, 2022

(30) Foreign Application Priority Data

May 27, 2021 (JP) ................. 2021-089436

(51) Int. Cl.
*H02P 8/16* (2006.01)
*H02P 8/34* (2006.01)

(52) U.S. Cl.
CPC . *H02P 8/16* (2013.01); *H02P 8/34* (2013.01)

(58) Field of Classification Search
CPC ...... H02P 6/18; H02P 6/06; H02P 8/34; H02P 6/14; H02K 29/12; H02K 21/24; G04C 3/16; H01R 39/46
See application file for complete search history.

(56) References Cited

U.S. PATENT DOCUMENTS 11,329,597 B2 * 5/2022 Vanko .................. H02P 7/2913

FOREIGN PATENT DOCUMENTS

JP 2010-093914 A 4/2010
JP 2010093914 A * 4/2010

* cited by examiner

*Primary Examiner* — Said Bouziane
(74) *Attorney, Agent, or Firm* — Pearne & Gordon LLP

(57) ABSTRACT

A motor drive control device includes a control unit monitoring a rotational state of a rotor of a two-phase stepping motor, setting an energization angle θ representing a magnitude of an electric angle for continuously energizing, of coils of two phases of the two-phase stepping motor, a coil of one phase in one direction based on the rotational state of the rotor, and generating a control signal Sd for controlling driving of the two-phase stepping motor based on the set energization angle θ, and a drive unit driving the coils of two phases based on the control signal Sd.

9 Claims, 14 Drawing Sheets

MOTOR DRIVE CONTROL DEVICE, MOTOR UNIT, AND MOTOR DRIVE CONTROL METHOD

CROSS-REFERENCE TO RELATED APPLICATIONS

This application claims the benefit of priority to Japanese Application No. JP2021-089436, filed May 27, 2021, the entire disclosure of which is hereby incorporated herein by reference.

TECHNICAL FIELD

The present invention relates to a motor drive control device, a motor unit, and a motor drive control method, and for example, relates to a motor drive control device for driving a stepping motor.

BACKGROUND ART

As a stepping motor, a two-phase stepping motor having two phases is known.

As drive systems of the two-phase stepping motors, a one-phase excitation system, a two-phase excitation system, and a one-two-phase excitation system are known.

The one-phase excitation system is a system of switching a phase to be excited for each single phase. In the one-phase excitation system, an energization angle representing a magnitude of an electric angle for continuously energizing a one-phase coil in one direction is 90 degrees, and a two-phase stepping motor is commutated at every 90 degrees.

The two-phase excitation system is a system of switching phases to be excited for each two phases. In the two-phase excitation system, an energization angle is 180 degrees, and a two-phase stepping motor is commutated at every 90 degrees.

The one-two-phase excitation system is a system for switching phases to be excited by alternately switching one-phase excitation and two-phase excitation. In the one-two-phase excitation system, an energization angle is typically 135 degrees, and a two-phase stepping motor is commutated at every 45 degrees.

For example, Patent Document 1 discloses a motor drive control technique for providing, in a one-phase excitation period, a period for performing two-phase excitation of the same phases as phases in a next two-phase excitation period in order to suppress fluctuation in rotational speed of a two-phase stepping motor when the two-phase stepping motor is driven by the one-two-phase excitation system.

CITATION LIST

Patent Literature

Patent Document 1: JP 2010-93914 A

SUMMARY OF INVENTION

Technical Problem

As a method of controlling the drive of a two-phase stepping motor to be adopted in a predetermined application, the present inventors have studied a control method of changing a rotational speed of the two-phase stepping motor according to a load by using a one-two-phase excitation system generating torque larger than torque generated by one-phase excitation. Specifically, the control method is a closed-loop control method of generating appropriate torque for a load by detecting a point of a back electromotive voltage of a non-excited coil becoming zero (zero crossing point) in a one-phase excitation period, identifying a position of a rotor of the two-phase stepping motor, and determining a commutation timing based on the identified position of the rotor.

According to the above-described control method studied by the present inventors, when the load of the two-phase stepping motor is heavy, the rotational speed of the rotor decreases, and when the load is light, the rotational speed of the rotor increases, so that the torque can be adjusted by changing the rotational speed according to the load.

However, for example, the study by the present inventors has discovered that when the load suddenly becomes light because of applying a load in a reverse direction or the like, the rotational speed of the rotor excessively increases, and data processing by a microcontroller constituting a motor drive control device cannot keep up with the rotational speed of the rotor, so that the drive control of the two-phase stepping motor becomes unstable, and thus, there is a possibility that a target to be driven by the two-phase stepping motor may vibrate, or abnormal noise may occur.

The present invention has been made in view of the above-described problem, and an object of the present invention is to increase the stability of drive control of a two-phase stepping motor against load fluctuation.

Solution to Problem

A motor drive control device according to a typical embodiment of the present invention includes a control unit monitoring a rotational state of a rotor of a two-phase stepping motor, setting an energization angle representing a magnitude of an electric angle for continuously energizing, of coils of two phases of the two-phase stepping motor, a coil of one phase in one direction based on the rotational state of the rotor, and generating a control signal for controlling driving of the two-phase stepping motor based on the set energization angle, and a drive unit driving the coils of two phases based on the control signal.

Advantageous Effects of Invention

The motor drive control device according to the present invention can enhance the stability of drive control of the two-phase stepping motor against load fluctuation.

DESCRIPTION OF EMBODIMENTS

1. Overview of Embodiment

Figure 1:
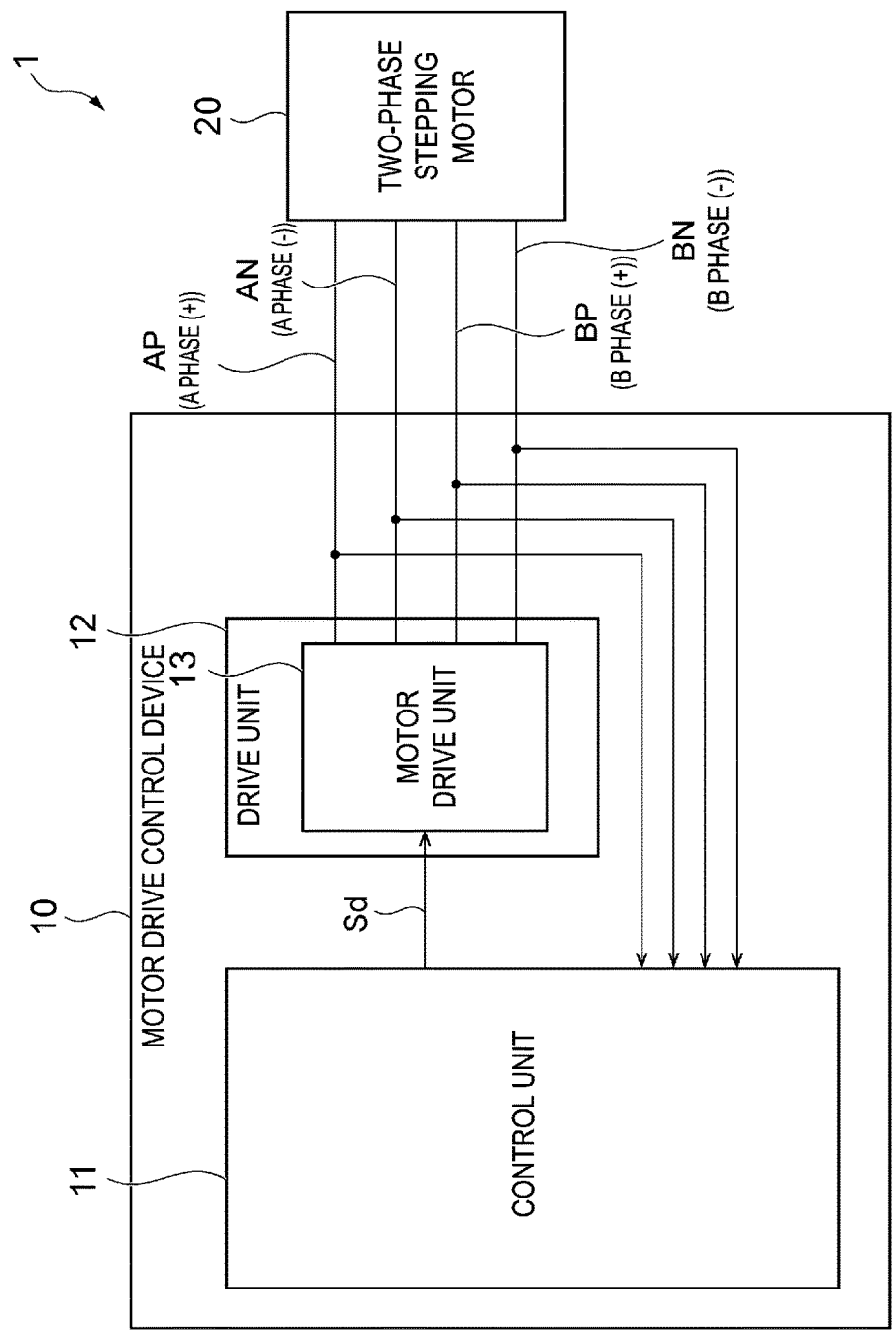
FIG. 1 is a block diagram illustrating a configuration of a motor unit according to Embodiment 1.

First, an overview of a typical embodiment of the invention disclosed in the present application will be described. Note that, in the following description, reference signs in the drawings corresponding to the constituent elements of the invention are mentioned in parentheses as an example.

[1] A motor drive control device (10) according to a typical embodiment of the present invention includes a control unit (11, 11A) monitoring a rotational state of a rotor (22) of a two-phase stepping motor (20), setting an energization angle (θ) representing a magnitude of an electric angle for continuously energizing, of coils of two phases (21, 21A, 21B) of the two-phase stepping motor, a coil of one phase in one direction based on the rotational state of the rotor, generating a control signal (Sd) for controlling driving of the two-phase stepping motor based on the set energization angle, and a drive unit (12) driving the coils of two phases based on the control signal.

[2] In the motor drive control device in [1] described above, the control unit may monitor a rotational speed of the rotor as the rotational state of the rotor, and may set the energization angle such that the energization angle decreases, as the rotational speed of the rotor increases.

[3] In the motor drive control device in [1] described above, the control unit (11A) may monitor a load of the rotor as the rotational state of the rotor, and may set the energization angle such that the energization angle decreases as the load of the rotor decreases.

[4] In the motor drive control device in [2] described above, the control unit may have, as operation modes, a one-two-phase excitation mode of alternately repeating one-phase excitation of exciting the coil for one phase of the coils of two phases, and two-phase excitation of exciting the coils for two phases of the coils of two phases, and a one-phase excitation mode of exciting the coil for one phase of the coils of two phases, and the control unit may set the energization angle to 90° and select the one-phase excitation mode when the rotational speed of the rotor becomes equal to or larger than an upper limit threshold value (Rtu), and may set the energization angle to a value larger than 90° and select the one-two-phase excitation mode when the rotational speed of the rotor becomes equal to or smaller than a lower limit threshold value (Rtd) smaller than the upper limit threshold value.

[5] In the motor drive control device in [4] described above, in a state of the energization angle being set to 90°, the control unit may change the energization angle from 90° to the value larger than 90° with an elapse of time, when the rotational speed of the rotor becomes equal to or smaller than the lower limit threshold value.

[6] In the motor drive control device in [5] described above, in a state of the energization angle being set to the value larger than 90°, the control unit may change the energization angle from the value larger than 90° to 90° with an elapse of time, when the rotational speed of the rotor becomes equal to or larger than the upper limit threshold value.

[7] In the motor drive control device in [4] described above, in a state of the energization angle being set to 90°, the control unit may change the energization angle from 90° to the value larger than 90° in a stepwise manner according to a decrease in the rotational speed of the rotor.

[8] In the motor drive control device in [7] described above, in a state of the energization angle being set to the value larger than 90°, the control unit may change the energization angle from the value larger than 90° to 90° in a stepwise manner according to an increase in the rotational speed of the rotor when the rotational speed of the rotor becomes equal to or larger than the upper limit threshold value.

[9] A motor unit (1) according to a typical embodiment of the present invention includes the motor drive control device (10) in any one of [1] to [8] describe above, and the two-phase stepping motor (20).

[10] A method according to a typical embodiment of the present invention is a motor drive control method for controlling driving of a two-phase stepping motor (20) by a motor drive control device (10). The method includes a first step (S4, S9) of monitoring, by the motor drive control device, a rotational state of a rotor of the two-phase stepping motor, a second step (S8, S13) of setting, by the motor drive control device, an energization angle (θ) representing a magnitude of an electric angle for continuously energizing, of coils of two phases of the two-phase stepping motor, a coil of one phase in one direction, based on the rotational state of the rotor, a third step (S8, S13) of generating, by the motor drive control device, a control signal for controlling driving of the two-phase stepping motor based on the energization angle set in the second step, and a fourth step (S8, S13) of driving, by the motor drive control device, the coils of two phases based on the control signal.

2. Specific Examples of Embodiments

Hereinafter, specific examples of the embodiments of the present invention will be described with reference to the accompanying drawings. Note that, in the following description, constituent elements common to each of the embodiments are denoted with the same reference signs and repeated descriptions will be omitted.

Embodiment 1

FIG. 1 is a block diagram illustrating a configuration of a motor unit according to Embodiment 1.

As illustrated in FIG. 1, a motor unit 1 includes a two-phase stepping motor 20 and a motor drive control device 10 driving the two-phase stepping motor 20. For example, the motor unit 1 is applicable to various devices using, as a power source, a motor such as an actuator available for heating ventilation and air-conditioning (HVAC) serving as an air-conditioning unit for an on-board application.

Figure 2:
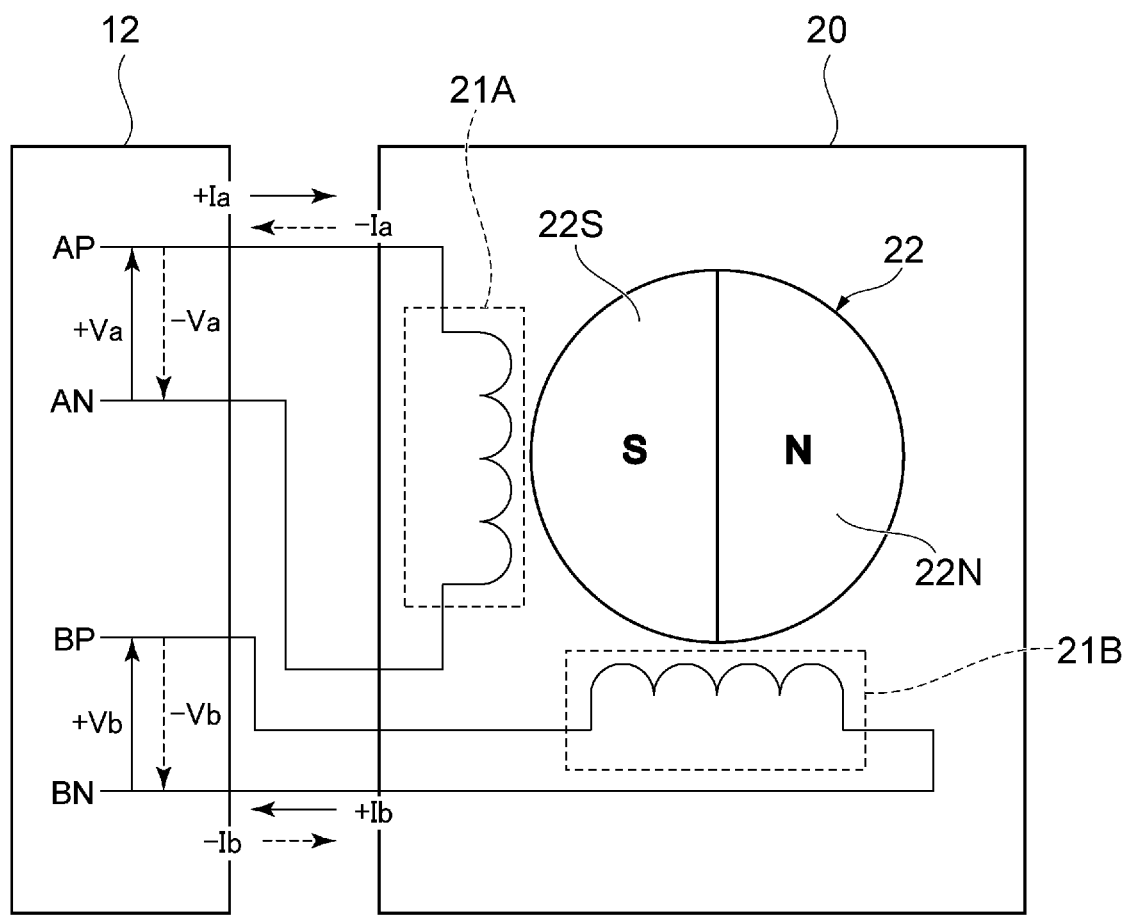
FIG. 2 is a diagram schematically illustrating a configuration of a two-phase stepping motor 20 according to Embodiment 1.

FIG. 2 is a diagram schematically illustrating a configuration of the two-phase stepping motor 20 according to Embodiment 1.

The two-phase stepping motor 20 is, for example, a stepping motor including coils of two phases. As illustrated in FIG. 2, the two-phase stepping motor 20 includes an A-phase coil 21A and a B-phase coil 21B, a rotor 22, and a two-phase stator yoke (not illustrated).

Each of the coils 21A and 21B is a coil exciting the stator yoke (not illustrated). Each of the coils 21A and 21B is connected to a drive unit 12 to be described later. Currents (coil currents) with different phases flow into the respective coils 21A and 21B.

Note that, in the present embodiment, when not being individually distinguished, the coils 21A and 21B may be simply denoted as a "coil 21".

The rotor 22 includes a permanent magnet subjected to multipolar magnetization along a circumferential direction such that an S pole 22S and an N pole 22N are alternately inverted. Note that in FIG. 2, a case of the rotor 22 with two poles is illustrated as an example.

The stator yoke is disposed around the rotor 22 in proximity to an outer circumferential part of the rotor 22. The phase of the coil current flowing through each of the coils 21A and 21B is periodically switched, so that the rotor 22 rotates. An output shaft (not illustrated) is connected to the rotor 22, and the output shaft is driven by rotational force of the rotor 22.

The motor drive control device 10 is a device for driving the two-phase stepping motor 20. For example, the motor drive control device 10 controls energizing states of the coils 21A and 21B of each of the phases of the two-phase stepping motor 20 based on a drive instruction, for example, from a host device (not illustrated) to control rotating and stopping of the two-phase stepping motor 20.

As illustrated in FIG. 1, the motor drive control device 10 includes a control unit 11 and a drive unit 12.

The drive unit 12 is a functional unit for driving the two-phase stepping motor 20 by energizing the coils 21A and 21B of the two-phase stepping motor 20. The drive unit 12 includes a motor drive unit 13.

The motor drive unit 13 supplies drive power to the two-phase stepping motor 20 based on a control signal Sd generated by the control unit 11. As illustrated in FIG. 2, the motor drive unit 13 is connected to a terminal AP at a positive electrode side of the coil 21A, a terminal AN at a negative electrode side of the coil 21A, a terminal BP at a positive electrode side of the coil 21B, and a terminal BN at a negative electrode side of the coil 21B, and energizes the coils 21A and 21B by applying a voltage to each of the terminals AP, AN, BP, and BN.

The motor drive unit 13 includes, for example, an H-bridge circuit including four switching elements (for example, transistors). The motor drive unit 13 selectively turns on and off each switching element constituting the H-bridge circuit to switch the energization of the coils 21A and 21B, for example.

As illustrated in FIG. 2, when a current of +Ia flows into the A-phase coil 21A, the motor drive unit 13 applies a voltage of "+Va" to the terminal AP with respect to the terminal AN of the coil 21A, for example. On the other hand, when a current of −Ia flows into the A-phase coil 21A, the motor drive unit 13 applies a voltage of "−Va" to the terminal AP with respect to the terminal AN of the coil 21A. Similarly, when a current of +Ib flows into the B-phase coil 21B, the motor drive unit 13 applies a voltage of "+Vb" to the terminal BP with respect to the terminal BN of the coil 21B, and when a current of −Ib flows into the B-phase coil 21B, the motor drive unit 13 applies a voltage of "−Vb" to the terminal BP with respect to the terminal BN of the coil 21B, for example.

The motor drive unit 13 switches the energizing state of each of the coils 21A and 21B by switching the voltage to be applied between the terminals of each of the coils 21A and 21B as described above, based on the control signal Sd for controlling the driving of the two-phase stepping motor 20, the control signal Sd being provided by the control unit 11.

The control unit 11 is a functional unit for performing centralized control of the motor drive control device 10. The control unit 11 is a program processing device (for example, a microcontroller) having a configuration of including, for example, a processor such as a CPU, various types of storage devices such as a RAM and a ROM, and peripheral circuits such as a timer (counter), an A/D conversion circuit, a D/A conversion circuit, and an input/output I/F circuit connected to each other via a bus. In the present embodiment, the control unit 11 is packaged as an integrated circuit (IC), but is not limited to such a packaged unit.

The control unit 11 has, as operation modes for performing energization switching control of the two-phase stepping motor 20, a one-two-phase excitation mode of driving the two-phase stepping motor 20 by a one-two-phase excitation system, and a one-phase excitation mode of driving the two-phase stepping motor 20 by a one-phase excitation system.

The one-two-phase excitation mode is an operation mode of alternately repeating one-phase excitation of exciting the coil 21 for one phase of the coils 21 of two phases of the two-phase stepping motor 20 and two-phase excitation of exciting the coils 21 for two phases of the coils 21 of two phases. The one-phase excitation mode is an operation mode of exciting the coil 21 for one phase of the coils 21 of two phases.

The control unit 11 generates the control signal Sd for controlling the driving of the two-phase stepping motor 20 according to the set operation mode, and drives the two-phase stepping motor 20 through the drive unit 12.

As described above, when a load is reduced or a load in a reverse direction is applied in driving the two-phase stepping motor 20 in the one-two-phase excitation mode, the rotational speed of the rotor 22 becomes too fast, and there is not enough time for the microcontroller serving as the control unit 11 performing centralized control of the motor drive control device 10 to perform data processing, and there is a possibility that the motor drive control may become unstable.

Thus, when the energization switching control of the two-phase stepping motor 20 is performed, the control unit 11 performs processing to be described below in order to limit changes in the rotational speed of the rotor 22 associated with the load fluctuation.

First, a relationship between an energization angle and each period of the one-phase excitation and the two-phase excitation in the energization switching control of the two-phase stepping motor 20 will be described.

Figure 3:
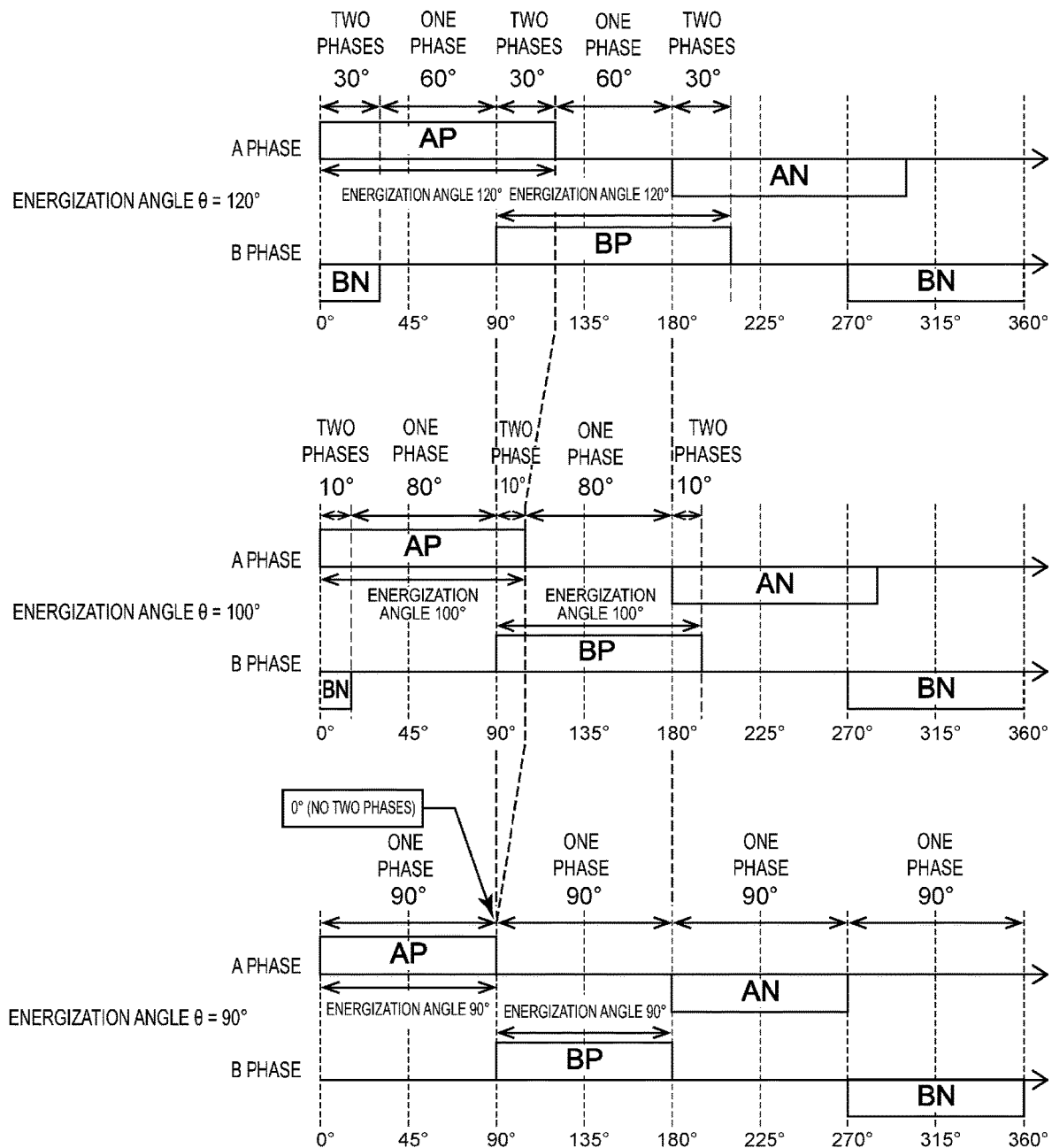
FIG. 3 is a diagram illustrating a relationship between an energization angle and a period of one-phase excitation and a period of two-phase excitation in energization switching control of a two-phase stepping motor.

FIG. 3 is a diagram illustrating a relationship between an energization angle and a period of the one-phase excitation and a period of the two-phase excitation in the energization switching control of the two-phase stepping motor.

In FIG. 3, the horizontal axis represents an electric angle. Respective excitation states of the A-phase and B-phase coils in a case of the energization angle θ=120° are illustrated in the upper part of this drawing, respective excitation states of the A-phase and B-phase coils in a case of the energization angle θ=100° are illustrated in the middle part of this drawing, and respective excitation states of the A-phase and B-phase coils in a case of the energization angle θ=90° are illustrated in the lower part of this drawing.

Typically, in the energization switching control in the one-two-phase excitation mode of the two-phase stepping motor, the smaller the energization angle θ is, the longer the period of the one-phase excitation is, while the period of the two-phase excitation becomes shorter. For example, as illustrated in the upper part of FIG. 3, when the energization angle θ is set to 120° in the one-two-phase excitation mode, the electric angle in the period of the one-phase excitation is 60°, and the electric angle in the period of the two-phase excitation is 30°, but as illustrated in the middle part of FIG. 3, when the energization angle θ is set to 100° in the one-two-phase excitation mode, the electric angle in the period of the one-phase excitation is 80°, and the electric angle in the period of the two-phase excitation is 10°. Then, as illustrated in the lower part of FIG. 3, when the energization angle θ is reduced to 90°, the period of the two-phase excitation is eliminated, and switching is performed from the one-two-phase excitation mode to the one-phase excitation mode.

In this way, in the energization switching control of the two-phase stepping motor, the period of the one-phase excitation and the period of the two-phase excitation can be changed by changing the energization angle θ.

Typically, in the energization switching control of a two-phase stepping motor, the shorter the period of two-phase excitation is, the smaller the torque of the two-phase stepping motor is. Thus, when the load of the two-phase stepping motor 20 is constant, the smaller the energization angle θ is, the shorter the period of the two-phase excitation is and the smaller the torque is, and consequently, the rotational speed of the rotor 22 is reduced. For example, in driving the two-phase stepping motor in the one-two-phase excitation mode, the rotational speed of the rotor 22 when the energization angle θ is set to 100° is lower than the rotational speed of the rotor 22 when the energization angle θ is set to 120°. When the energization angle is further reduced to 90°, that is, when the two-phase stepping motor 20 is driven in the one-phase excitation mode, the rotational speed of the rotor 22 is further reduced.

Thus, the control unit 11 limits the change in the rotational speed of the rotor 22 associated with the load fluctuation of the two-phase stepping motor 20 by changing the energization angle θ according to the rotational state of the rotor 22 of the two-phase stepping motor 20.

Specifically, the control unit 11 monitors the rotational state of the rotor 22 of the two-phase stepping motor 20, and sets the energization angle θ based on the rotational state of the rotor 22. More specifically, the control unit 11 monitors the rotational speed of the rotor 22 as the rotational state of the rotor 22, and switches the operation mode by setting the energization angle θ such that the energization angle θ decreases as the rotational speed of the rotor 22 increases.

Figure 4:
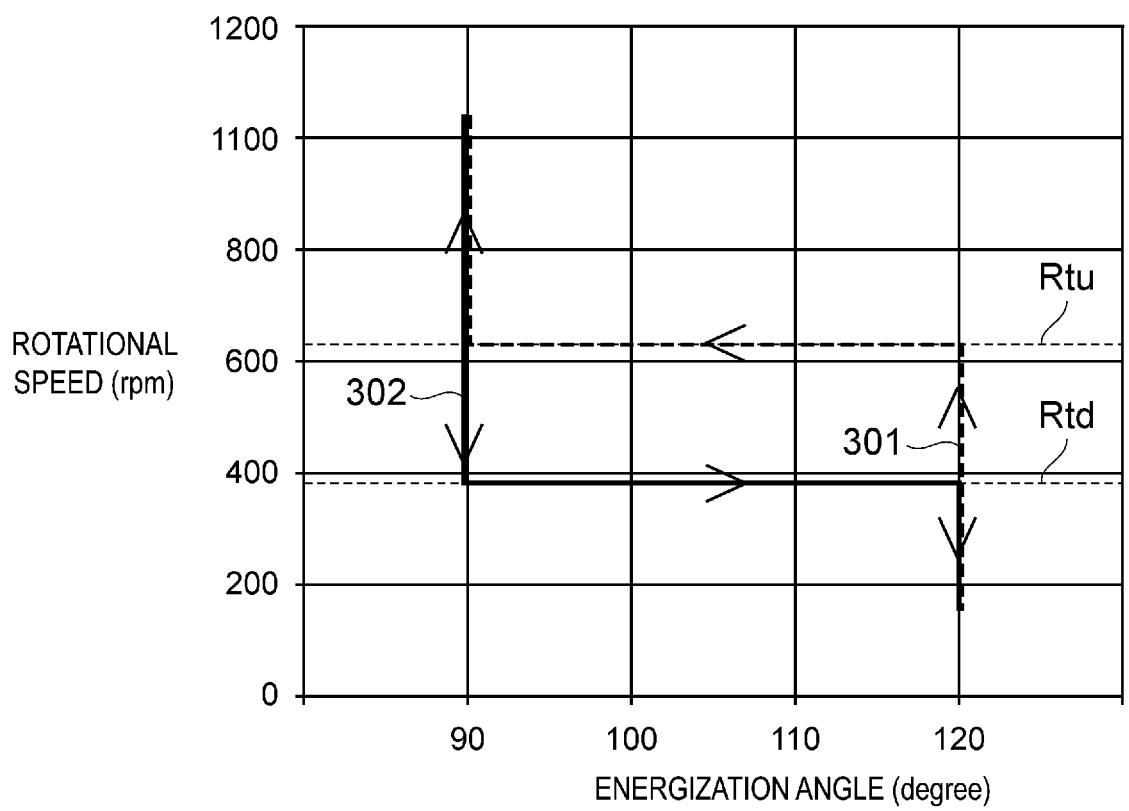
FIG. 4 is a diagram illustrating an example of a method for setting an energization angle θ according to Embodiment 1.

FIG. 4 is a diagram illustrating an example of a method for setting the energization angle θ according to Embodiment 1.

In FIG. 4, the horizontal axis represents the energization angle θ [°], and the vertical axis represents the rotational speed [rpm] of the rotor 22 of the two-phase stepping motor 20 (as an example). In addition, a reference sign of 301 represents a change in the energization angle θ when the rotational speed increases, and a reference sign of 302 represents a change in the energization angle θ when the rotational speed decreases.

For example, as illustrated in FIG. 4, as determination values of the rotational speed for switching the operation mode (the energization angle θ), an upper limit threshold value Rtu and a lower limit threshold value Rtd smaller than the upper limit threshold value Rtu are set.

The upper limit threshold value Rtu is a threshold value of the rotational speed for switching the operation mode from the one-two-phase excitation mode to the one-phase excitation mode. When the rotational speed of the rotor 22 becomes equal to or larger than the upper limit threshold value Rtu, the control unit 11 sets the energization angle θ to 90°, and selects the one-phase excitation mode.

The lower limit threshold value Rtd is a threshold value of the rotational speed for switching the operation mode from the one-phase excitation mode to the one-two-phase excitation mode. When the rotational speed of the rotor 22 becomes equal to or smaller than the lower limit threshold value Rtd, the control unit 11 sets the energization angle θ to a value larger than 90° (for example, 90°<θ≤135°), and selects the one-two-phase excitation mode.

Note that in the present embodiment, a case of setting the energization angle θ to "120°" in the one-two-phase excitation mode is described as an example, but the value of the energization angle θ is not limited to this value, and can be set to any value within the range of 90°<θ≤135°.

For example, as illustrated in FIG. 4, in a state of driving the two-phase stepping motor 20 in the one-two-phase excitation mode with the energization angle θ=120°, the control unit 11 sets the energization angle θ to 90° and performs switching to the one-phase excitation mode when the rotational speed of the rotor 22 of the two-phase stepping motor 20 becomes equal to or larger than the upper limit threshold value Rtu.

Additionally, as illustrated in FIG. 4, in a state of driving the two-phase stepping motor 20 in the one-phase excitation mode, when the rotational speed of the rotor 22 of the two-phase stepping motor 20 becomes equal to or smaller than the lower limit threshold value Rtd, the energization angle θ is set to 120° and performs switching to the one-two-phase excitation mode.

The number of the determination values of the rotational speed for switching the energization angle θ may be one, but it is preferable to provide the two threshold values of the upper limit threshold value Rtu and the lower limit threshold value Rtd, as described above, in order to improve the stability of the drive control of the motor. For example, a difference between the upper limit threshold value Rtu and the lower limit threshold value Rtd is preferably at least equal to or larger than 100 rpm.

This makes it possible to prevent switching of the operation mode from being repeated many times due to, for example, a variation in a driving speed of the rotor 22 immediately after switching of the operation mode.

Next, a method for switching between the one-phase excitation and the two-phase excitation in the one-two-phase excitation mode will be described.

In each operation mode, the control unit 11 performs energization switching of the coils 21 based on the set energization angle θ and a detection result of zero crossing in a back electromotive voltage generated in a non-excited coil 21 during the one-phase excitation.

First, the energization switching control of the coils 21 in the one-two-phase excitation mode will be described.

Figure 5:
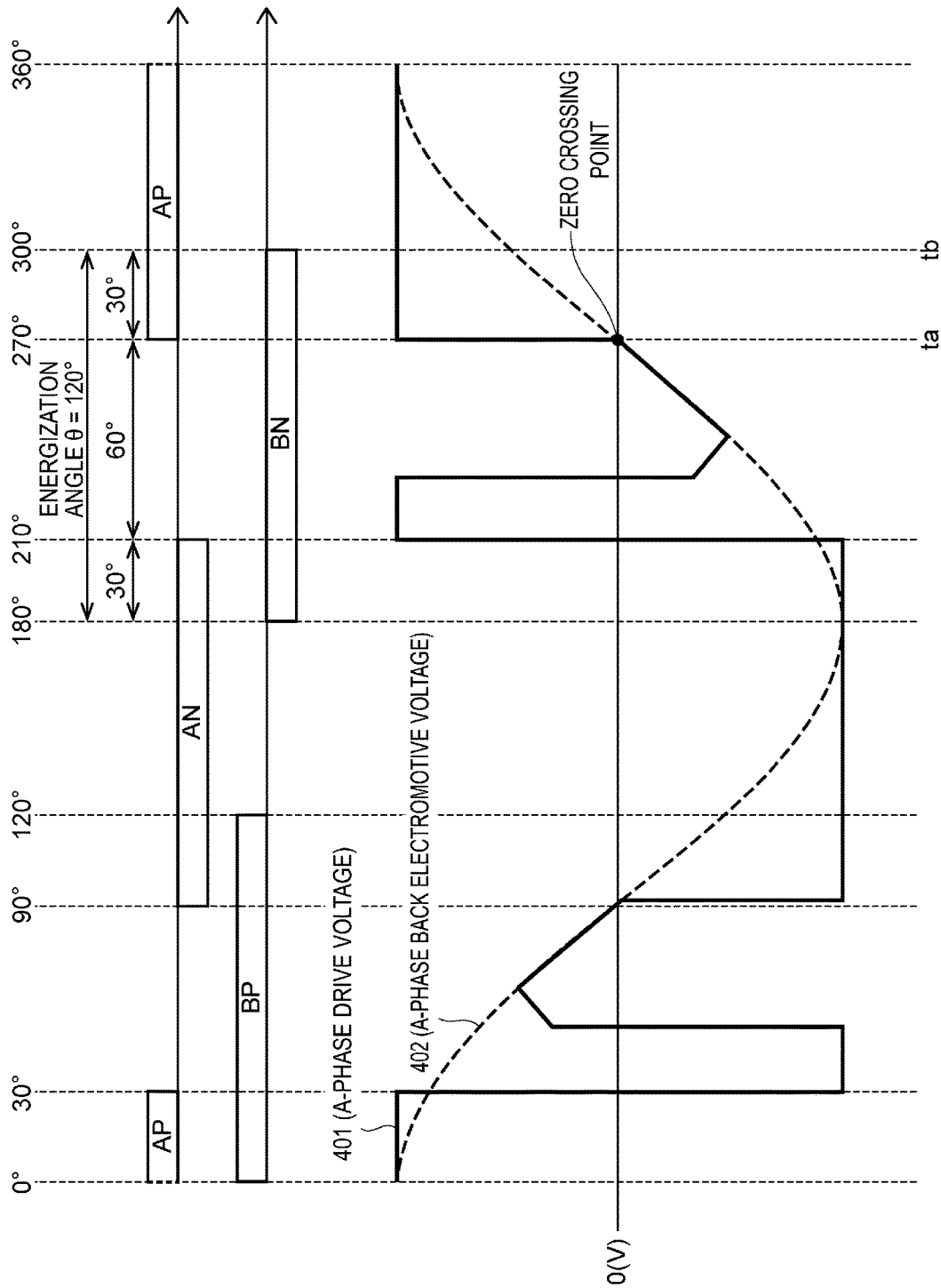
FIG. 5 is a diagram for describing energization switching control of the two-phase stepping motor in a one-two-phase excitation mode according to Embodiment 1.

FIG. 5 is a diagram for describing the energization switching control of the two-phase stepping motor in the one-two-phase excitation mode according to Embodiment 1.

In this diagram, a reference sign of 401 represents a voltage of the terminal AP with respect to the terminal AN of the A-phase coil 21A (hereinafter, also referred to as an "A-phase voltage"), and a reference sign of 402 represents a back electromotive voltage of the A-phase coil 21A. This diagram illustrates, as an example, a voltage waveform of the A-phase coil in a case of setting the energization angle θ=120° and performing the energization switching control of the two-phase stepping motor 20 in the one-two-phase excitation mode. Note that the periods represented by the signs AP, AN, BP, and BN in the diagram indicate that voltages are applied to respective terminals (for example, the terminal AP at the positive electrode side of the A-phase coil 21A) corresponding to these signs.

As illustrated in FIG. 5, when the two-phase stepping motor 20 is driven in the one-two-phase excitation mode, the control unit 11 switches the energizing state of the two-phase stepping motor 20 such that the one-phase excitation and the two-phase excitation are alternately repeated. For example, in FIG. 5, in a period of the two-phase excitation from 180° to 210° (at an electric angle of 30°), the coil 21A is excited to be negative (−) with the A-phase voltage being set to "−Va", and the coil 21B is excited to be negative with the B-phase voltage being set to "−Vb". In the next period of the one-phase excitation (at an electric angle of 60°) from 210° to 270°, the coil 21A is not excited with the A-phase voltage being set to "0", while the coil 21B is continuously excited to be negative with the B-phase voltage being set to "−Vb". In the next period of the two-phase excitation (at the electric angle 30°) from 270° to 300°, the coil 21A is excited to be positive (+) with the A-phase voltage being set to "+Va", and the coil 21B is continuously excited to be negative with the B-phase voltage being set to "−Vb".

Here, the period for performing the one-phase excitation of the two-phase stepping motor 20 and the period for performing the two-phase excitation are determined based on the back electromotive voltages generated in the coils 21A and 21B and the set value of the energization angle θ.

First, the period of the one-phase excitation of the two-phase stepping motor 20 is determined as follows.

The period of the one-phase excitation of the two-phase stepping motor 20 is determined based on the back electromotive voltage generated in the other non-excited coil 21 when one coil 21 is excited.

Specifically, the control unit 11 generates the control signal Sd so as to switch the excitation state of the two-phase stepping motor 20 from the one-phase excitation to the two-phase excitation according to the detection result of the zero crossing point in the back electromotive voltage generated in the non-excited coil 21 after switching from the two-phase excitation to the one-phase excitation.

For example, as illustrated in FIG. 5, in a period of the one-phase excitation while the electric angle is from 210° to 270°, a spike-like voltage in a positive direction is generated in the non-excited A-phase coil 21A, and then, a back electromotive voltage synchronized to the rotation of the rotor 22 of the two-phase stepping motor 20 is generated. Thereafter, the control unit 11 generates the control signal Sd so as to perform switching from the one-phase excitation to the two-phase excitation when detecting a point of the back electromotive voltage of the A-phase coil 21A becoming 0 V (zero crossing point) at a time ta.

The period of the two-phase excitation of the two-phase stepping motor 20 is determined as follows.

As described above, in the period for performing the one-phase excitation of the two-phase stepping motor 20, a back electromotive voltage is generated in the non-excited coil 21. On the other hand, in the period for performing the two-phase excitation of the two-phase stepping motor 20 (for example, a period while the electric angle is from 180° to 210° and a period while an electric angle is from 270° to 300° in FIG. 5, and the like), both of the A-phase coil 21A and the B-phase coil 21B are excited, and thus, the back electromotive voltage of any of the coils 21A and 21B cannot be measured. Thus, unlike the switching from the one-phase excitation to the two-phase excitation, a timing of switching from the two-phase excitation to the one-phase excitation cannot be determined based on the back electromotive voltage of the coil 21.

Thus, the control unit 11 determines the period for performing the two-phase excitation based on the elapsed time per unit angle while the two-phase stepping motor 20 is being excited and the preset energization angle θ.

Specifically, the control unit 11 determines the period for performing the two-phase excitation, that is, a target energization time period T2$n$ of the two-phase excitation, based on the elapsed time per unit angle while the two-phase stepping motor 20 is being excited and the energization angle θ. The target energization time period T2$n$ of the two-phase excitation can be determined, for example, by a technique to be described below.

Figure 6:
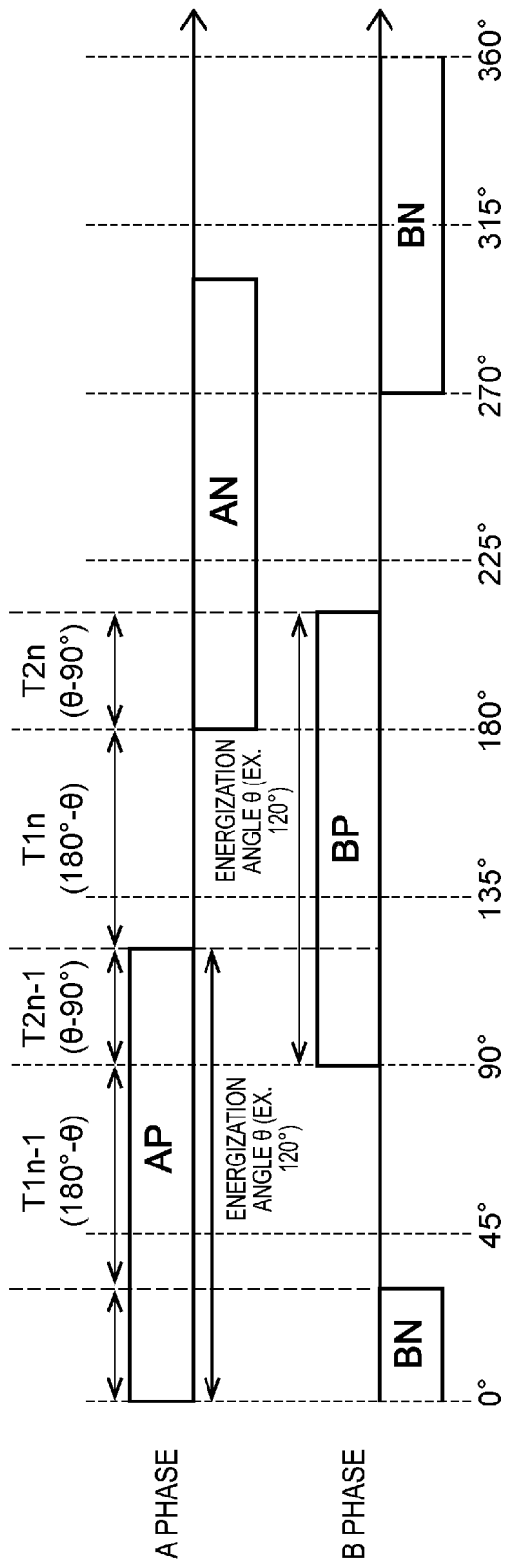
FIG. 6 is a diagram for describing a method for determining a target energization time period of two-phase excitation in the one-two-phase excitation mode.

FIG. 6 is a diagram for describing a method for determining the target energization time period of the two-phase excitation in the one-two-phase excitation mode.

In FIG. 6, the horizontal axis represents a time and an electric angle. In addition, in the upper part of this diagram, the energizing state of the A phase is illustrated, and in the lower part of the same diagram, the energizing state of the B phase is illustrated. In FIG. 6, T1$n$ represents an n-th period (n is an integer equal to or larger than 1) of the one-phase excitation, T1$n$−1 represents an (n−1)-th period of the one-phase excitation, T2$n$ represents an n-th period of the two-phase excitation, and T2$n$−1 represents an (n−1)-th period of the two-phase excitation.

In FIG. 6, when an energization angle is θ, each magnitude of the electric angles corresponding to the periods T1$n$−1 and T1$n$ of the one-phase excitation can be expressed as (180°−θ). Also, each magnitude of the electric angles corresponding to the periods T2$n$−1 and T2$n$ of the two-phase excitation can be expressed as (θ−90°).

As illustrated in FIG. 6, first, the control unit 11 measures the period T1$n$ of the one-phase excitation. Next, the control unit 11 calculates an elapsed time per unit angle based on a measurement value of the period T1$n$ of the one-phase excitation and the magnitude of the electric angle (180°−θ) corresponding to the period T1$n$ of the one-phase excitation, and calculates the target energization time period T2$n$ of the next two-phase excitation based on the calculated elapsed time and the set energization angle θ.

For example, the control unit 11 calculates the target energization time period T2$n$ based on Equation (1) to be described below.

[Equation 1]

$$T2n = \frac{T1n}{(180° - \theta)} \times (\theta - 90°)... \quad (1)$$

In Equation (1) described above, "T1n/(180°−θ)" represents the elapsed time per unit angle when the two-phase stepping motor 20 is subjected to the one-phase excitation, that is, a period of time required for advancing the electric angle by the unit angle (1°) in the period T1n of the one-phase excitation. Also, (θ−90°) is an electric angle corresponding to the period of the two-phase excitation.

For example, when the energization angle θ is 120°, Equation (1) can be denoted by Equation (2) to be described below.

[Equation 2]

$$T2n = \frac{T1n}{60°} \times 30°... \quad (2)$$

As will be appreciated from Equation (2), the target energization time period (the period of the two-phase excitation) T2n is a period of time required for performing energization by the electric angle of 30°.

Note that the control unit 11 may measure the period of the one-phase excitation performed immediately before the two-phase excitation when calculating the target energization time period T2n of the two-phase excitation based on Equation (1) described above, and may use the period as a measurement value of the period T1n of the one-phase excitation. Alternatively, each of a plurality of periods of the one-phase excitation performed before the two-phase excitation is measured, and then, an average value of the measured plurality of periods may be used as a measurement value of the period T1n of the one-phase excitation.

Here, the average value of the plurality of periods of the one-phase excitation may be a simple average value, or the average value may be calculated with weights added to the plurality of periods of the one-phase excitation performed before the two-phase excitation and the target energization time period T2n is set based on the average value. For example, the average value may be calculated with a weight added to each period of the one-phase excitation such that a specific weight increases as a period is temporally closer to the two-phase excitation being a calculation target of the target energization time period T2n.

The control unit 11 determines the target energization time period T2n of the two-phase excitation based on the above-described technique. Then, the control unit 11 generates the control signal Sd so as to switch the excitation state of the two-phase stepping motor 20 from the two-phase excitation to the one-phase excitation when the target energization time period T2n elapses after the start of the two-phase excitation.

For example, as illustrated in FIG. 5, in the period for performing the two-phase excitation while the electric angle is from 270° to 300°, both of the A-phase coil 21A and the B-phase coil 21B are excited, and thus, a back electromotive voltage cannot be measured. Thus, the control unit 11 generates the control signal Sd so as to perform switching from the two-phase excitation to the one-phase excitation at a time tb (the electric angle of 300°) after the elapse of the target energization time period T2n corresponding to the electric angle 30° from the start of the two-phase excitation at the time to (the electric angle of 270°).

As described above, when the two-phase stepping motor 20 is driven in the one-two-phase excitation mode, the control unit 11 performs switching from the one-phase excitation to the two-phase excitation according to the detection result of the zero crossing point of the back electromotive voltage generated in the non-excited coil 21 in the one-phase excitation, and performs switching from the two-phase excitation to the one-phase excitation after the elapse of the target energization time period T2n set based on the elapsed time per unit angle while the two-phase stepping motor 20 is being excited after the two-phase excitation is started and the energization angle θ.

Next, energization switching control of the coils 21 in the one-phase excitation mode will be described.

When the energization angle θ is set to 90°, the target energization time period T2n of the two-phase excitation is 0 (zero) according to Equation (1) described above. That is, the operation mode is switched from the one-two-phase excitation mode to the one-phase excitation mode. In the one-phase excitation mode, the control unit 11 detects a zero crossing point of a back electromotive voltage generated in the non-excited coil 21 in the one-phase excitation, similar to the one-two-phase excitation mode. The control unit 11 switches the one excited coil 21 and an excitation direction each time the zero crossing point of the back electromotive voltage is detected (see the lower part in FIG. 3).

Figure 7:
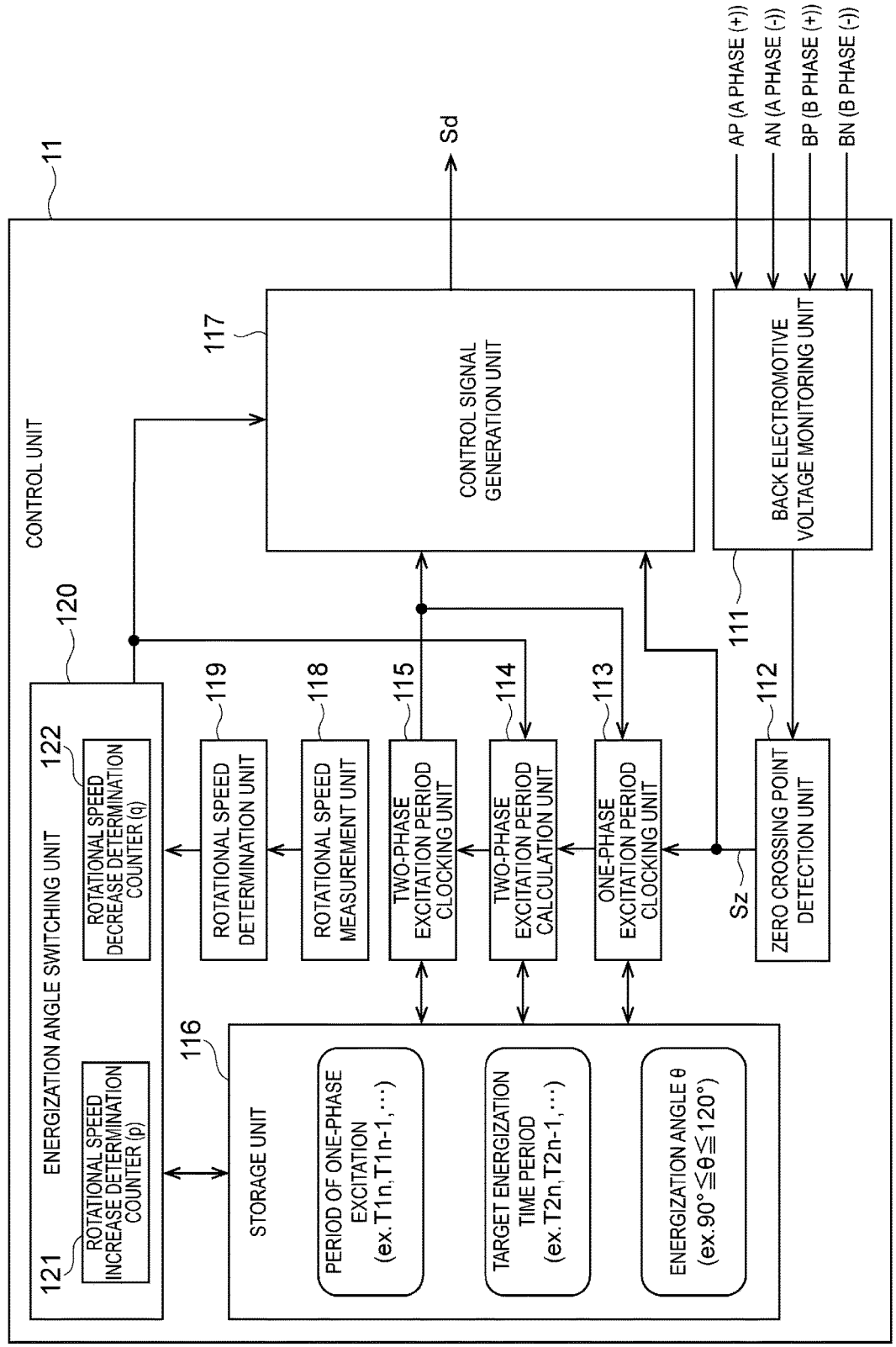
FIG. 7 is a diagram illustrating a functional block configuration of a control unit according to Embodiment 1.

FIG. 7 is a diagram illustrating a functional block configuration of the control unit 11 according to Embodiment 1.

As illustrated in FIG. 7, the control unit 11 includes, as functional units for implementing the described-above energization switching control of the coils 21A and 21B of the two-phase stepping motor 20, a back electromotive voltage monitoring unit 111, a zero crossing point detection unit 112, a one-phase excitation period clocking unit 113, a two-phase excitation period calculation unit 114, a two-phase excitation period clocking unit 115, a storage unit 116, a control signal generation unit 117, a rotational speed measurement unit 118, a rotational speed determination unit 119, and an energization angle switching unit 120.

In a program processing device (the microcontroller) serving as the control unit 11 described above, these functional units are achieved, for example, by a processor executing various types of arithmetic processes in accordance with a program stored in a storage device, and controlling peripheral circuits such as an A/D conversion circuit and a timer.

The back electromotive voltage monitoring unit 111 is a functional unit for monitoring a back electromotive voltage generated in the coils 21A and 21B of the respective phases.

The zero crossing point detection unit 112 is a functional unit for detecting a zero crossing point of a back electromotive voltage generated in the coils 21A and 21B of the two-phase stepping motor 20 based on a monitoring result from the back electromotive voltage monitoring unit 111. When detecting a zero crossing point of a back electromotive voltage of the non-excited coil 21, the zero crossing point detection unit 112 outputs a detection signal Sz indicating that the zero crossing point has been detected.

The one-phase excitation period clocking unit 113 is a functional unit for measuring the period T1n of the one-phase excitation of the two-phase stepping motor 20. The one-phase excitation period clocking unit 113 can be implemented, for example, by using a timer (counter) constituting the microcontroller described above, or the like.

The one-phase excitation period clocking unit 113 starts clocking in response to switching of the excitation state of the two-phase stepping motor 20 from the two-phase excitation to the one-phase excitation. For example, the one-phase excitation period clocking unit 113 starts measuring the period T1$n$ of the one-phase excitation according to a signal for notifying the end of the period of the two-phase excitation, the signal being output from the two-phase excitation period clocking unit 115 to be described below.

The one-phase excitation period clocking unit 113 stops the clocking when a zero crossing point of a back electromotive voltage is detected. For example, according to the detection signal Sz output from the zero crossing point detection unit 112 and indicating that the zero crossing point has been detected, the one-phase excitation period clocking unit 113 stops measuring the period T1$n$ of the one-phase excitation, stores the measurement value of the period T1$n$ of the one-phase excitation in the storage unit 116, and outputs a notification signal indicating the end of the period T1$n$ of the one-phase excitation to the two-phase excitation period calculation unit 114.

Here, the storage unit 116 may store information about a plurality of periods of the one-phase excitation measured by the one-phase excitation period clocking unit 113, or may store only information about the latest period of the one-phase excitation.

The storage unit 116 is a functional unit for storing various types of data necessary for performing the energization switching control. The storage unit 116 stores, for example, the measurement value of the period T1$n$ of the one-phase excitation measured by the one-phase excitation period clocking unit 113 described above, a value of the energization angle θ, information about Equation (1) described above, and a value of the target energization time period T2$n$ being the period of the two-phase excitation to be described below.

The two-phase excitation period calculation unit 114 is a functional unit for calculating the target energization time period T2$n$ of the two-phase excitation of the two-phase stepping motor 20. The two-phase excitation period calculation unit 114 calculates the target energization time period T2$n$ of the two-phase excitation in response to switching of the excitation state of the two-phase stepping motor 20 from the one-phase excitation to the two-phase excitation.

The two-phase excitation period calculation unit 114 reads out data necessary for calculating the target energization time period T2$n$ of the two-phase excitation from the storage unit 116 according to the signal output from the one-phase excitation period clocking unit 113 and indicating the end of the period T1$n$ of the one-phase excitation, and calculates the target energization time period T2$n$. The two-phase excitation period calculation unit 114 reads out the value of the energization angle θ, the measurement value of the period (T1$n$) of the one-phase excitation, and the information about Equation (1) described above from the storage unit 116, calculates the target energization time period T2$n$ based on Equation (1) described above, and stores the target energization time period T2$n$ in the storage unit 116.

When calculating the target energization time period T2$n$, the two-phase excitation period calculation unit 114 reads out, from the storage unit 116, a value of an energization angle θ corresponding to an operation mode specified by the energization angle switching unit 120 to be described below. For example, when an operation mode signal instructing the one-two-phase excitation mode is output from the energization angle switching unit 120, the two-phase excitation period calculation unit 114 reads out "120°" as the value of the energization angle θ from the storage unit 116 to calculate the target energization time period T2$n$. On the other hand, when the operation mode signal instructing the one-phase excitation mode is output from the energization angle switching unit 120, the two-phase excitation period calculation unit 114 reads out "90°" as the value of the energization angle θ from the storage unit 116 to calculate the target energization time period T2$n$.

After calculating the target energization time period T2$n$, the two-phase excitation period calculation unit 114 instructs the two-phase excitation period clocking unit 115 to start measuring the period of the two-phase excitation.

The two-phase excitation period clocking unit 115 is a functional unit for measuring a period of the two-phase excitation of the two-phase stepping motor 20. The two-phase excitation period clocking unit 115 can be implemented, for example, by using a timer (counter) constituting the microcontroller described above, or the like.

The two-phase excitation period clocking unit 115 starts measuring the period of the two-phase excitation according to the instruction to start the measurement from the two-phase excitation period calculation unit 114. For example, the two-phase excitation period clocking unit 115 reads out the target energization time period T2$n$ from the storage unit 116 according to the instruction to start the measurement from the two-phase excitation period calculation unit 114, sets the target energization time period T2$n$ in the timer of the two-phase excitation period clocking unit 115, and starts the measurement. When the measurement time reaches the target energization time period T2$n$, the two-phase excitation period clocking unit 115 stops the measurement and outputs a signal indicating the end of the two-phase excitation.

Note that when the first technique described above is used as the method for determining the target energization time period T2$n$ of the two-phase excitation, the timer included in the one-phase excitation period clocking unit 113 and the timer included in the two-phase excitation period clocking unit 115 are not simultaneously used. Thus, in this case, only one timer may be provided and shared by the one-phase excitation period clocking unit 113 and the two-phase excitation period clocking unit 115.

On the other hand, when the second technique described above is used as the method for determining the target energization time period T2$n$ of the two-phase excitation, the timer included in the one-phase excitation period clocking unit 113 measures a period of time between zero crossing points of the back electromotive voltage, and the timer included in the two-phase excitation period clocking unit 115 measures a period of the two-phase excitation. Thus, a period of simultaneously using the respective timers of the one-phase excitation period clocking unit 113 and the two-phase excitation period clocking unit 115 occurs. Thus, in this case, since the one-phase excitation period clocking unit 113 and the two-phase excitation period clocking unit 115 cannot share a single timer, each of the one-phase excitation period clocking unit 113 and the two-phase excitation period clocking unit 115 needs to include a timer.

The control signal generation unit 117 is a functional unit for generating the control signal Sd for controlling driving of the two-phase stepping motor 20. The control signal generation unit 117 can be implemented, for example, by program processing by the processor constituting the microcontroller described above and a peripheral circuit such as an input/output I/F circuit.

The control signal generation unit 117 instructs switching between the one-phase excitation and the two-phase excitation of the two-phase stepping motor 20 by using the control signal Sd. The control signal generation unit 117 generates and outputs the control signal Sd corresponding to the operation mode specified by an operation mode signal output from the energization angle switching unit 120 to be described below.

For example, when the one-phase excitation mode is specified by the operation mode signal, the control signal generation unit 117 generates the control signal Sd so as to switch the excitation state of the two-phase stepping motor 20 each time a zero crossing point of the back electromotive voltage is detected by the zero crossing point detection unit 112. On the other hand, when the one-two-phase excitation mode is specified by the operation mode signal, the control signal generation unit 117 generates the control signal Sd so as to switch the excitation state of the two-phase stepping motor 20 from the one-phase excitation to the two-phase excitation according to the detection signal Sz from the zero crossing point detection unit 112 in the period T1$n$ of the one-phase excitation. Additionally, the control signal generation unit 117 generates the control signal Sd so as to switch the excitation state of the two-phase stepping motor 20 from the two-phase excitation to the one-phase excitation when the measurement time by the two-phase excitation period clocking unit 115 reaches the target energization time period T2$n$ in the two-phase excitation. Furthermore, the control signal generation unit 117 generates the control signal Sd so as to switch the excitation state of the two-phase stepping motor 20 from the two-phase excitation to the one-phase excitation according to the signal indicating the end of the two-phase excitation output from the two-phase excitation period clocking unit 115.

Note that the control signal generation unit 117 may generate the control signal Sd so as to switch the excitation state of the two-phase stepping motor 20 from the one-phase excitation to the two-phase excitation according to the signal indicating the end of the one-phase excitation output from the one-phase excitation period clocking unit 113, instead of the detection signal Sz from the zero crossing point detection unit 112.

The rotational speed measurement unit 118 is a functional unit for measuring the rotational speed of the rotor 22 of the two-phase stepping motor 20. The rotational speed measurement unit 118 calculates the number of rotations of the rotor 22 per unit time, for example, based on the period T1$n$ of the one-phase excitation measured by the one-phase excitation period clocking unit 113, in a similar manner to the two-phase excitation period calculation unit 114, and uses the number of rotations of the rotor 22 per unit time as a measurement value of the rotational speed of the rotor 22.

Note that, when a rotational speed detection device such as an encoder for measuring the rotational speed of the rotor 22 of the two-phase stepping motor 20 is provided at the motor unit 1, the rotational speed measurement unit 118 may measure the rotational speed of the rotor 22 based on a detection signal from the rotational speed detection device.

The rotational speed determination unit 119 is a functional unit for comparing the rotational speed of the rotor 22 of the two-phase stepping motor 20 with a determination value of the rotational speed for switching the energization angle θ.

As described above, in the present motor drive control device 100, as the determination values of the rotational speed for switching the energization angle θ, the upper limit threshold value Rtu and the lower limit threshold value Rtd smaller than the upper limit threshold value Rtu are set. Information about the upper limit threshold value Rtu and the lower limit threshold value Rtd is, for example, stored in the storage unit 116.

The rotational speed determination unit 119 is a functional unit for comparing the measurement value of the rotational speed by the rotational speed measurement unit 118 with the upper limit threshold value Rtu and the lower limit threshold value Rtd. For example, when the measurement value of the rotational speed becomes equal to or larger than the upper limit threshold value Rtu, the rotational speed determination unit 119 provides a signal indicating the fact to the energization angle switching unit 120. Additionally, when the measurement value of the rotational speed becomes equal to or smaller than the lower limit threshold value Rtd, the rotational speed determination unit 119 provides a signal indicating the fact to the energization angle switching unit 120.

The energization angle switching unit 120 is a functional unit for instructing switching of the energization angle θ. The energization angle switching unit 120 outputs an operation mode signal instructing the energization angle θ, that is, an operation mode, in according to the signal from the rotational speed determination unit 119.

For example, in a state of performing the energization switching control in the one-two-phase excitation mode (the energization angle θ=120°), when the signal indicating that the measurement value of the rotational speed has become equal to or larger than the upper limit threshold value Rtu is output from the rotational speed determination unit 119, the energization angle switching unit 120 outputs an operation mode signal instructing the one-phase excitation mode (the energization angle θ=90°). When receiving the operation mode signal instructing the one-phase excitation mode, the two-phase excitation period calculation unit 114 sets the energization angle θ to 90° and sets the target energization time period T2$n$ of the two-phase excitation to "0". In addition, when receiving the operation mode signal instructing the one-phase excitation mode, the control signal generation unit 117 generates the control signal Sd so as to drive the two-phase stepping motor 20 in the one-phase excitation mode and provides the control signal Sd to the drive unit 12.

Additionally, in a state of performing the energization switching control in the one-phase excitation mode (the energization angle θ=90°), when the operation mode signal indicating that the measurement value of the rotational speed has become equal to or smaller than the lower limit threshold value Rtd is output from the rotational speed determination unit 119, the energization angle switching unit 120 outputs an operation mode signal instructing the one-two-phase excitation mode (the energization angle θ=120°). The two-phase excitation period calculation unit 114 sets the energization angle θ to 120°, and calculates the target energization time period T2$n$ of the two-phase excitation when receiving the operation mode signal instructing the one-two-phase excitation mode. Additionally, when receiving the operation mode signal instructing the one-two-phase excitation mode, the control signal generation unit 117 generates the control signal Sd so as to drive the two-phase stepping motor 20 in the one-two-phase excitation mode and provides the control signal Sd to the drive unit 12.

The switching of the operation mode is preferably performed when the increase and the decrease of the rotational speed with respect to the upper limit threshold value Rtu and the lower limit threshold value Rtd are detected a plurality of times, respectively. For example, the energization angle switching unit 120 may include a rotational speed increase determination counter 121 and a rotational speed decrease determination counter 122, count the number of times the rotational speed becomes equal to or larger than the upper limit threshold value Rtu by using the rotational speed increase determination counter 121, count the number of times the rotational speed becomes equal to or smaller than the lower limit threshold value Rtd by using the rotational speed decrease determination counter 122, and switch the operation mode based on the count values of these counters.

Specifically, the energization angle switching unit 120 increments the rotational speed increase determination counter 121 (+1) when the signal indicating that the measurement value of the rotational speed has become equal to or larger than the upper limit threshold value Rtu is output from the rotational speed determination unit 119, and resets the rotational speed increase determination counter 121 when the measurement value of the rotational speed becomes smaller than the upper limit threshold value Rtu.

Additionally, the energization angle switching unit 120 increments the rotational speed decrease determination counter 122 (+1) when the signal indicating that the measurement value of the rotational speed has become equal to or smaller than the lower limit threshold value Rtd is output from the rotational speed determination unit 119, and resets the rotational speed decrease determination counter 122 when the measurement value of the rotational speed becomes larger than the lower limit threshold value Rtd.

The energization angle switching unit 120 outputs the operation mode signal instructing the one-phase excitation mode (the energization angle $\theta$90°) when the count value of the rotational speed increase determination counter 121 becomes equal to or larger than a first threshold value (for example, an integer equal to or larger than 2). Additionally, the energization angle switching unit 120 outputs the operation mode signal instructing the one-two-phase excitation mode (the energization angle $\theta=120°$) when the count value of the rotational speed decrease determination counter 122 becomes equal to or larger than a second threshold value (for example, an integer equal to or larger than 2).

Note that the first threshold value and the second threshold value may be the same value, or may be different values. Information about the first threshold value and the second threshold value is, for example, stored in advance in the storage unit 116.

In this manner, by using the rotational speed increase determination counter 121 and the rotational speed decrease determination counter 122, it is possible to prevent switching of the operation mode according to an instantaneous change in the rotational speed of the rotor 22.

As an example of the present embodiment, a case of the energization angle switching unit 120 including the rotational speed increase determination counter 121 and the rotational speed decrease determination counter 122 will be described.

Figure 8:
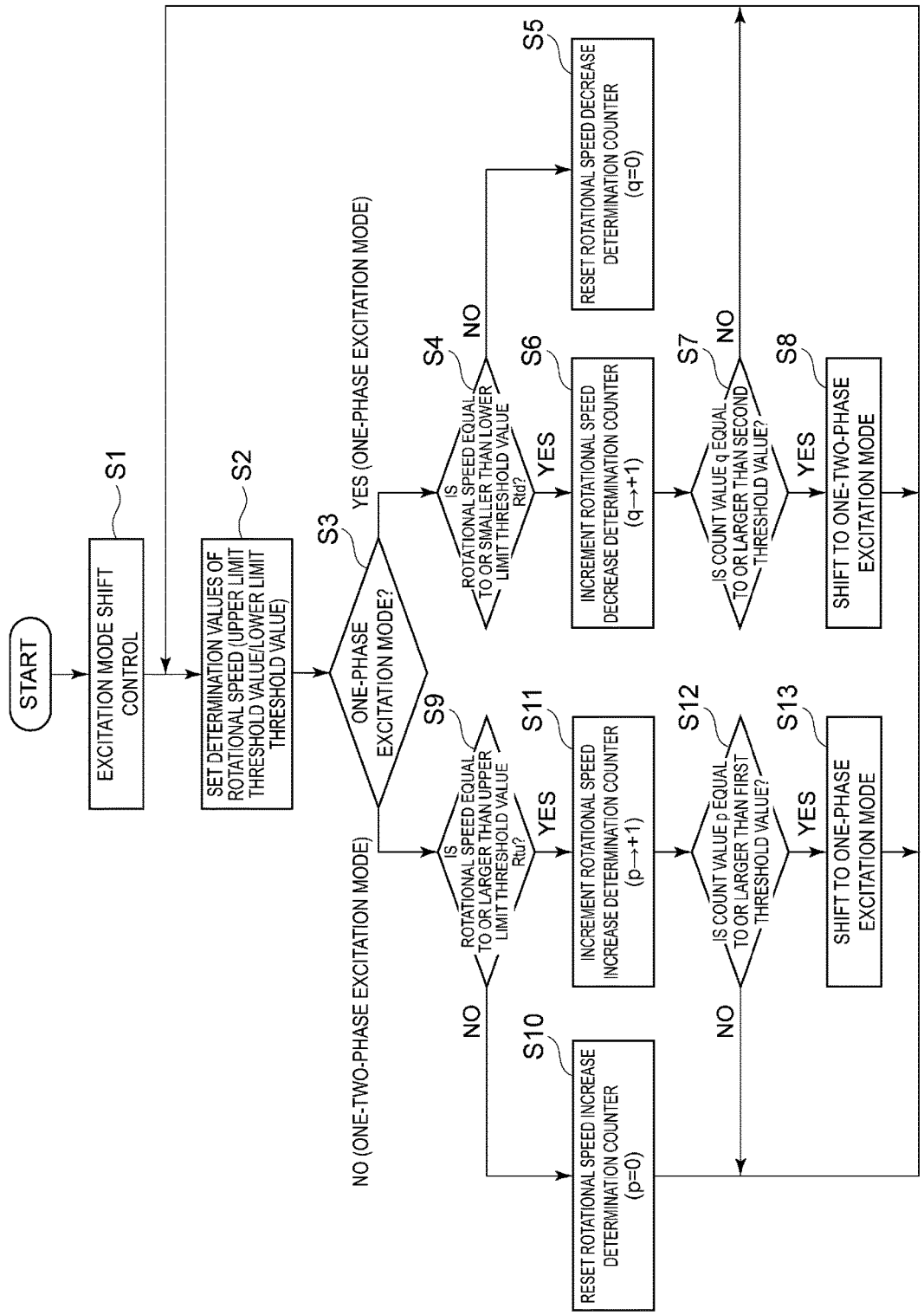
FIG. 8 is a flowchart illustrating a procedure of the method for setting the energization angle θ according to Embodiment 1.

FIG. 8 is a flowchart illustrating a procedure of the method for setting the energization angle $\theta$ according to Embodiment 1.

For example, when a drive instruction of the two-phase stepping motor 20 is input from an external host device after power is turned on, the motor drive control device 10 starts drive control (excitation mode shift control) of the two-phase stepping motor 20 (step S1).

First, the motor drive control device 10 sets determination values of the rotational speed corresponding to the energization angle $\theta$ set at the time (step S2). Here, as an example, after power is turned on, the one-phase excitation mode is initially set, and the energization angle $\theta$ is set to 90°. In this case, in step S2, the motor drive control device 10 sets the lower limit threshold value Rtd as a determination value of the rotational speed for switching the energization angle $\theta$ from 90° to 120° (switching the operation mode from the one-phase excitation mode to the one-two-phase excitation mode).

Next, the motor drive control device 10 determines whether the operation mode set at the time is the one-phase excitation mode or not (step S3). Here, as described above, since the next excitation state to be shifted to is the one-phase excitation at the A phase (step S3: YES), the energization angle switching unit 120 determines whether or not the rotational speed of the rotor 22 of the two-phase stepping motor 20 is equal to or smaller than the lower limit threshold value Rtd (step S4). When the rotational speed is not equal to or smaller than the lower limit threshold value Rtd (step S4: NO), the energization angle switching unit 120 resets a count value q of the rotational speed decrease determination counter 122 (step S5).

On the other hand, when the rotational speed is equal to or smaller than the lower limit threshold value Rtd (step S4: YES), the energization angle switching unit 120 increments the count value q of the rotational speed decrease determination counter 122 (step S6). Next, the energization angle switching unit 120 determines whether or not the count value q of the rotational speed decrease determination counter 122 is equal to or larger than the second threshold value (step S7).

When the count value q of the rotational speed decrease determination counter 122 is not equal to or larger than the second threshold value (step S7: NO), the motor drive control device 10 returns to step S2.

When the count value q of the rotational speed decrease determination counter 122 is equal to or larger than the second threshold value (step S7: YES), the motor drive control device 10 switches the operation mode from the one-phase excitation mode to the one-two-phase excitation mode (step S8). Specifically, as described above, the energization angle switching unit 120 outputs the operation mode signal instructing the one-two-phase excitation mode, the two-phase excitation period calculation unit 114 having received the operation mode signal sets the energization angle $\theta$ to 120° and calculates the target energization time period T$2n$ of the two-phase excitation, and the control signal generation unit 117 generates the control signal Sd so as to drive the two-phase stepping motor 20 in the one-two-phase excitation mode and provides the control signal Sd to the drive unit 12.

Thereafter, the motor drive control device 10 returns to step S2, and sets the determination value of the rotational speed corresponding to the energization angle $\theta$ set at the time. Here, since the operation mode has been set to the one-two-phase excitation mode (the energization angle $\theta=120°$) in previous step S8, the motor drive control device 10 sets the upper limit threshold value Rtu as a determination value of the rotational speed for switching the energization angle $\theta$ from 120° to 90° (switching the operation mode from the one-two-phase excitation mode to the one-phase excitation mode).

Next, the motor drive control device 10 determines the operation mode set at the time (step S3). Here, since the operation mode has been set to the one-two-phase excitation mode in step S8 preceding this step by two steps (step S3: NO), the energization angle switching unit 120 determines whether or not the rotational speed of the rotor 22 of the two-phase stepping motor 20 is equal to or larger than the upper limit threshold value Rtu (step S9).

When the rotational speed is not equal to or larger than the upper limit threshold value Rtu (step S9: NO), the energization angle switching unit 120 resets the count value p of the rotational speed increase determination counter 121 (step S10).

On the other hand, when the rotational speed is equal to or larger than the upper limit threshold value Rtu (step S9: YES), the energization angle switching unit 120 increments the count value p of the rotational speed increase determination counter 121 (step S11).

Next, the energization angle switching unit 120 determines whether or not the count value p of the rotational speed increase determination counter 121 is equal to or larger than the first threshold value (step S12). When the count value p of the rotational speed increase determination counter 121 is not equal to or larger than the first threshold value (step S12: NO), the motor drive control device 10 returns to step S2, and executes the processing of steps S2 to S10 described above again.

When the count value p of the rotational speed increase determination counter 121 is equal to or larger than the first threshold value (step S12: YES), the motor drive control device 10 switches the operation mode from the one-two-phase excitation mode to the one-phase excitation mode (step S13). Specifically, as described above, the energization angle switching unit 120 outputs the operation mode signal instructing the one-phase excitation mode, the two-phase excitation period calculation unit 114 having received the operation mode signal sets the energization angle θ to 90° and sets the target energization time period T2n of the two-phase excitation to 0 (zero), and the control signal generation unit 117 generates the control signal Sd and provides the control signal Sd to the drive unit 12 so as to drive the two-phase stepping motor 20 in the one-phase excitation mode. Thereafter, the motor drive control device 10 returns to step S2, and repeats the processing from steps S2 to S13 described above.

As described above, the motor drive control device 10 according to Embodiment 1 performs the energization switching control of the coils 21 of the two-phase stepping motor 20 by monitoring the rotational speed of the rotor 22 of the two-phase stepping motor 20, and setting the energization angle θ such that the energization angle θ decreases as the rotational speed of the rotor 22 increases.

According to this, when a load of the two-phase stepping motor 20 is reduced, and the rotational speed of the rotor 22 increases, torque of the two-phase stepping motor 20 can be reduced by decreasing the energization angle θ, and thus, it is possible to suppress an increase in the rotational speed of the rotor 22. This makes it possible to prevent the drive control of the two-phase stepping motor 20 from becoming unstable because the data processing by the microcontroller constituting the motor drive control device 10 (control unit 11) cannot keep up with the rotational speed of the rotor 22. That is, according to the motor drive control device 10 according to Embodiment 1, it is possible to increase the stability of the drive control of the two-phase stepping motor 20 against the load fluctuation.

Additionally, in the motor drive control device 10 according to Embodiment 1, the control unit 11 has the one-phase excitation mode and the one-two-phase excitation mode as the operation modes, sets the energization angle to 90° to select the one-phase excitation mode when the rotational speed of the rotor 22 becomes equal to or larger than the upper limit threshold value Rtu, and sets the energization angle θ to a value larger than 90° (for example, 120°) to select the one-two-phase excitation mode when the rotational speed of the rotor 22 becomes equal to or smaller than the lower limit threshold value Rtd (<Rtu).

This makes it possible to easily achieve switching of the energization angle θ according to the rotational speed of the rotor 22 as switching of the excitation system. Furthermore, two threshold values of the upper limit threshold value Rtu and the lower limit threshold value Rtd are provided as the determination values of the rotational speed for switching the energization angle θ, and thus, as described above, the operation mode switching can be prevented from being repeated many times due to a change in the drive speed of the rotor 22 immediately after switching of the operation mode.

Embodiment 2

In Embodiment 1, as an example of the switching technique of the energization angle, the case of rapidly switching between the one-phase excitation mode (θ=90°) and the one-two-phase excitation mode (θ=120°) has been described, but a switching technique of the energization angle according to Embodiment 2 is a technique of slowly changing the energization angle θ with an elapse of time.

Specifically, in a state of the energization angle being set to 90° (that is, in the state of the one-phase excitation mode), when the rotational speed of the rotor 22 becomes equal to or smaller than the lower limit threshold value Rtd, the control unit 11 changes the energization angle θ from 90° to a value larger than 90° with an elapse of time.

For example, in FIG. 4, in the one-phase excitation mode with the energization angle set to 90°, when the rotational speed of the rotor 22 becomes equal to or smaller than the lower limit threshold value Rtd, the energization angle switching unit 120 increases the energization angle θ from 90° to 120° by a unit angle φ for each constant period of time. As a result, after the operation mode is switched from the one-phase excitation mode to the one-two-phase excitation mode, the energization angle θ is continuously changed in the one-two-phase excitation mode, and thus, the rotational speed of the rotor 22 can be slowly increased.

Further, in a state of the energization angle θ being set to a value larger than 90° (for example, 120°) (that is, in the state of the one-two-phase excitation mode), the control unit 11 changes the energization angle θ from the value larger than 90° to 90° with an elapse of time when the rotational speed of the rotor 22 becomes equal to or larger than the upper limit threshold value Rtu.

For example, in FIG. 4, in the one-two-phase excitation mode with the energization angle set to 120°, when the rotational speed of the rotor 22 becomes equal to or larger than the upper limit threshold value Rtu, the energization angle switching unit 120 decreases the energization angle θ from 120° to 90° by the unit angle φ for each constant period of time. As a result, the operation mode is switched to the one-phase excitation mode when the energization angle θ reaches 90° after the energization angle θ is continuously changed from 120° to 90° in the one-two-phase excitation mode, and thus, the rotational speed of the rotor 22 can be slowly decreased.

Figure 9A:
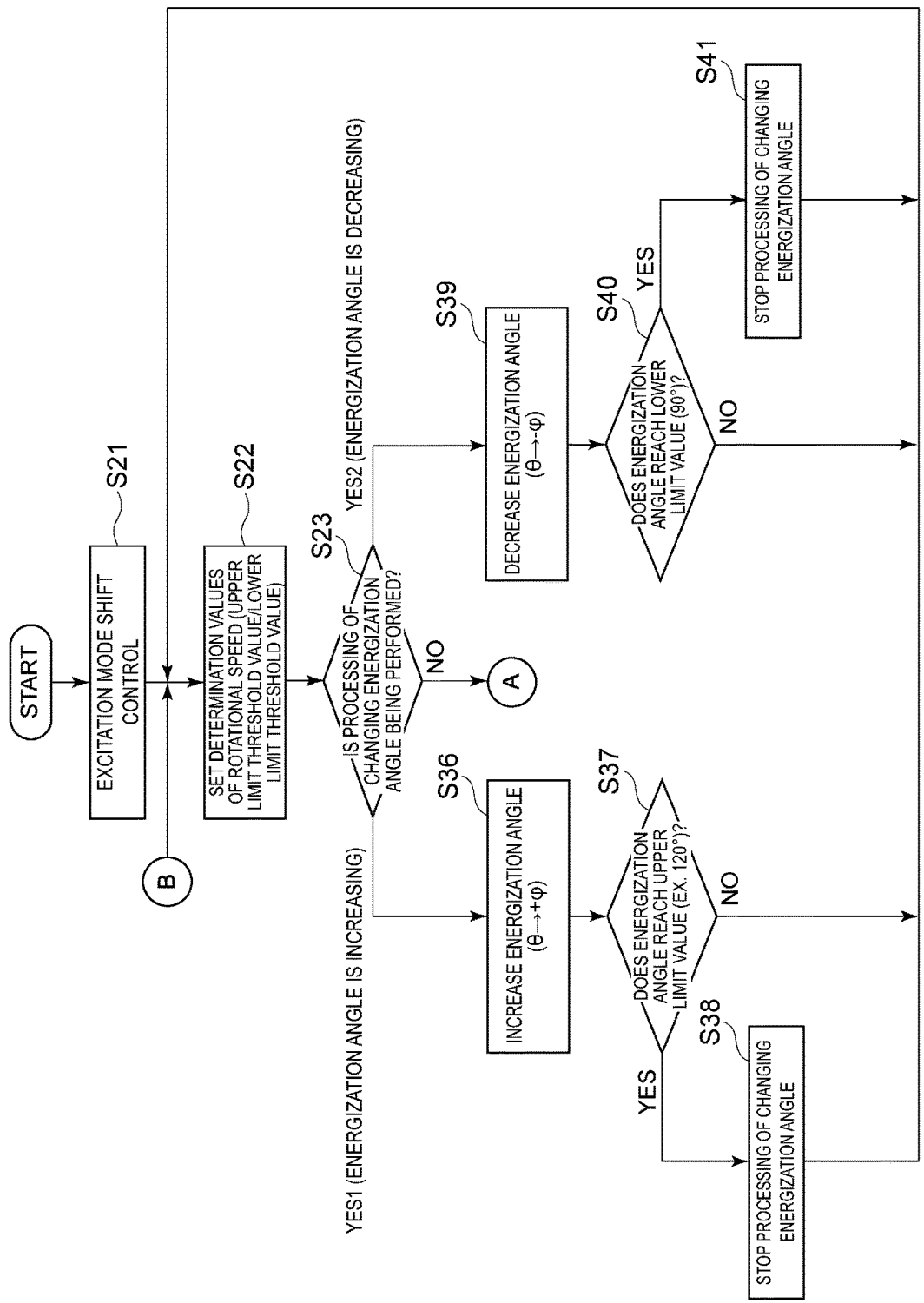
FIG. 9A is a flowchart illustrating a procedure of a method for setting the energization angle θ according to Embodiment 2.
Figure 9B:
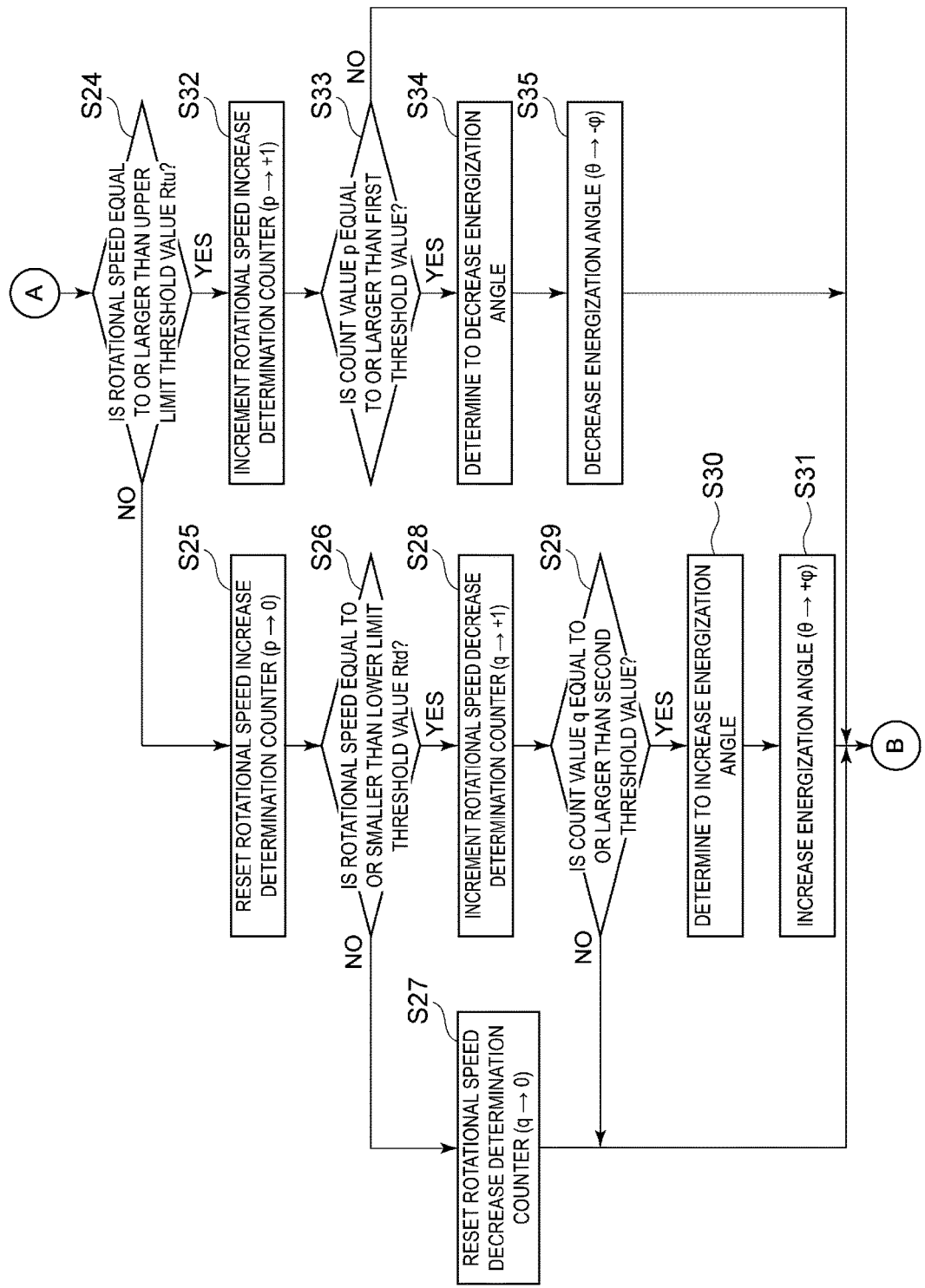
FIG. 9B is a flowchart illustrating a procedure of the method for setting the energization angle θ according to Embodiment 2.

FIG. 9 is a flowchart illustrating a procedure of a method for setting the energization angle θ according to Embodiment 2.

In FIG. 9, when a drive instruction of the two-phase stepping motor 20 is input from an external host device after power is turned on, the motor drive control device 10 starts drive control (excitation mode shift control) of the two-phase stepping motor 20 (step S21).

Next, the motor drive control device 10 sets determination values of the rotational speed (step S22). For example, the motor drive control device 10 sets the upper limit threshold value Rtu as a determination value of the rotational speed for switching the energization angle θ from 120° to 90° (switching the operation mode from the one-two-phase excitation mode to the one-phase excitation mode), and sets the lower limit threshold value Rtd as a determination value of the rotational speed for switching the energization angle θ from 90° to 120° (switching the operation mode from the one-phase excitation mode to the one-two-phase excitation mode).

Next, the motor drive control device 10 determines whether or not processing of increasing or decreasing the energization angle θ for each constant period of time is being performed (step S23). For example, immediately after activation of the motor drive control device 10, the energization angle θ is fixed (step S23: NO), and thus, in this case, the energization angle switching unit 120 determines whether or not the rotational speed of the rotor 22 of the two-phase stepping motor 20 is equal to or larger than the upper limit threshold value Rtu (step S24).

When the rotational speed is not equal to or larger than the upper limit threshold value Rtu (step S24: NO), the energization angle switching unit 120 resets the count value p of the rotational speed increase determination counter 121 (step S25). Next, the energization angle switching unit 120 determines whether or not the rotational speed of the rotor 22 of the two-phase stepping motor 20 is equal to or smaller than the lower limit threshold value Rtd (step S26).

When the rotational speed is not equal to or smaller than the lower limit threshold value Rtd (step S26: NO), the energization angle switching unit 120 resets the count value q of the rotational speed decrease determination counter 122 (step S27). Thereafter, the motor drive control device 10 returns to step S22.

In contrast, when the rotational speed is equal to or smaller than the lower limit threshold value Rtd (step S26: YES), the energization angle switching unit 120 increments the count value q of the rotational speed decrease determination counter 122 (step S28). Next, the energization angle switching unit 120 determines whether or not the count value q of the rotational speed decrease determination counter 122 is equal to or larger than the second threshold value (step S29).

When the count value q of the rotational speed decrease determination counter 122 is not equal to or larger than the second threshold value (step S29: NO), the motor drive control device 10 returns to step S22.

When the count value q of the rotational speed decrease determination counter 122 is equal to or larger than the second threshold value (step S29: YES), the motor drive control device 10 determines to increase the energization angle θ so as to switch the operation mode from the one-phase excitation mode to the one-two-phase excitation mode (step S30). Then, the energization angle switching unit 120 increases the energization angle θ by the unit angle φ (step S31). Thereafter, the motor drive control device 10 returns to step S22.

In step S24, when the rotational speed is equal to or larger than the upper limit threshold value Rtu (step S24: YES), the energization angle switching unit 120 increments the count value p of the rotational speed increase determination counter 121 (step S32).

Next, the energization angle switching unit 120 determines whether or not the count value p of the rotational speed increase determination counter 121 is equal to or larger than the first threshold value (step S33). When the count value p of the rotational speed increase determination counter 121 is not equal to or larger than the first threshold value (step S33: NO), the motor drive control device 10 returns to step S22. When the count value p of the rotational speed increase determination counter 121 is equal to or larger than the first threshold value (step S33: YES), the motor drive control device 10 determines to decrease the energization angle θ so as to switch the operation mode from the one-two-phase excitation mode to the one-phase excitation mode (step S34). Then, the energization angle switching unit 120 decreases the energization angle θ by the unit angle φ (step S35). Thereafter, the motor drive control device 10 returns to step S22.

In step S23, when the processing of increasing the energization angle θ for each constant period of time is being performed (step S23: YES1), the energization angle switching unit 120 further increases the energization angle θ by the unit angle φ (step S36).

Next, the energization angle switching unit 120 determines whether or not the energization angle θ reaches an upper limit value (for example, 120°) (step S37). When the energization angle θ does not reach the upper limit value (step S37: NO), the motor drive control device 10 returns again to step S22, and repeatedly performs the above-described processing until the energization angle θ reaches the upper limit value. When the energization angle θ reaches the upper limit value (step S37: YES), the processing of increasing the energization angle θ for each constant period of time is stopped (step S38). Thereafter, the motor drive control device 10 returns again to step S22.

In step S23, when the processing of decreasing the energization angle θ is being performed for each constant period of time (step S23: YES2), the energization angle switching unit 120 further decreases the energization angle θ by the unit angle φ (step S39).

Next, the energization angle switching unit 120 determines whether or not the energization angle θ reaches a lower limit value (90°) (step S40). When the energization angle θ does not reach the lower limit value (step S40: NO), the motor drive control device 10 returns again to step S22, and repeatedly performs the above-described processing until the energization angle θ reaches the lower limit value. When the energization angle θ reaches the lower limit value (90°) (step S40: YES), the processing of decreasing the energization angle θ for each constant period of time is stopped (step S41). Thereafter, the motor drive control device 10 returns again to step S22.

According to the above processing procedure, the energization angle θ can be continuously changed for each constant period of time.

As described above, according to the switching technique of the energization angle θ according to Embodiment 2, since the energization angle θ is continuously changed, the rotational speed of the rotor 22 can be slowly changed, and thus, more stable driving of the two-phase stepping motor 20 can be achieved.

Embodiment 3

In Embodiment 2, as an example of the switching technique of the energization angle, the case of continuously changing the energization angle θ for each constant period of time has been described, but a switching technique of the energization angle according to Embodiment 3 is a technique of changing the energization angle in a stepwise manner.

Figure 10:
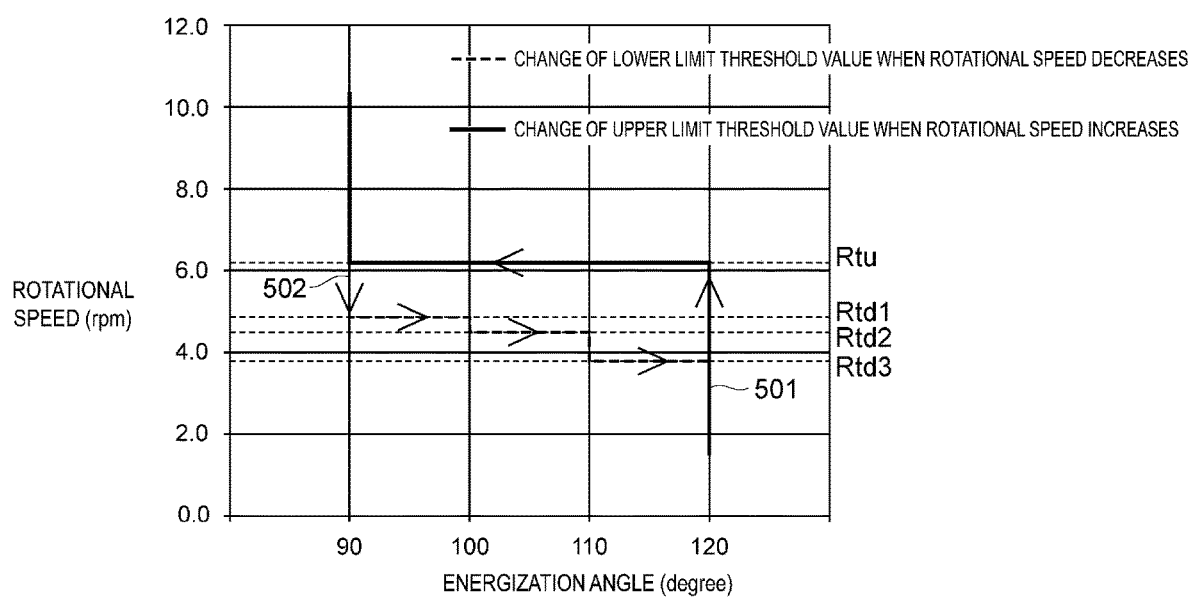
FIG. 10 is a diagram illustrating an example of a method for setting the energization angle θ according to Embodiment 3.

FIG. 10 is a diagram illustrating an example of a method for setting the energization angle θ according to Embodiment 3.

In FIG. 10, the horizontal axis represents the energization angle θ [°], and the vertical axis represents the rotational speed [rpm] of the rotor 22 of the two-phase stepping motor 20. Further, a reference sign 501 represents a change in the upper limit threshold value Rtu when the rotational speed increases, and a reference sign 502 represents a change in the lower limit threshold value Rtd when the rotational speed decreases. In the present example, the lower limit threshold value Rtd is set for each set energization angle θ until the rotational speed decreases and the energization angle θ is changed to 120°.

In Embodiment 3, in a state of the energization angle being set to 90°, the control unit 11 changes the energization angle from 90° to a value larger than 90° in a stepwise manner according to a decrease in the rotational speed of the rotor 22.

For example, as illustrated in FIG. 10, as determination values of the rotational speed for switching the operation mode (the energization angle θ), the upper limit threshold value Rtu and a plurality of lower limit threshold values Rtd1 to Rtd3 are set.

The lower limit threshold value Rtd1 is a threshold value of the rotational speed for switching the operation mode from the one-phase excitation mode to the one-two-phase excitation mode, and the lower limit threshold values Rtd2 and Rtd3 are threshold values of the rotational speed for switching (increasing) the energization angle θ in a stepwise manner in the one-two-phase excitation mode. For example, as illustrated in FIG. 10, in a state of driving the two-phase stepping motor 20 in the one-phase excitation mode with the energization angle θ=90°, when the rotational speed of the rotor 22 of the two-phase stepping motor 20 becomes equal to or smaller than the lower limit threshold value Rtd1, the control unit 11 (the energization angle switching unit 120) sets the energization angle θ to 100° from 90° to drive the two-phase stepping motor 20 in the one-two-phase excitation mode.

Next, as illustrated in FIG. 10, in a state of driving the two-phase stepping motor 20 in the one-two-phase excitation mode with the energization angle θ=100°, when the rotational speed of the rotor 22 of the two-phase stepping motor 20 becomes equal to or smaller than the lower limit threshold value Rtd2 (<Rtd1), the control unit 11 (the energization angle switching unit 120) sets the energization angle θ to 110° from 100° to drive the two-phase stepping motor 20 in the one-two-phase excitation mode.

Furthermore, as illustrated in FIG. 10, in a state of driving the two-phase stepping motor 20 in the one-two-phase excitation mode with the energization angle θ=110°, when the rotational speed of the rotor 22 of the two-phase stepping motor 20 becomes equal to or smaller than the lower limit threshold value Rtd3 (<Rtd2), the control unit 11 (the energization angle switching unit 120) sets the energization angle θ to 120° from 110° to drive the two-phase stepping motor 20 in the one-two-phase excitation mode.

Note that in the one-two-phase excitation mode, even when the energization angle θ is any value among 100°, 110°, and 120°, when the rotational speed of the rotor 22 of the two-phase stepping motor 20 becomes equal to or larger than the upper limit threshold value Rtu, the control unit 11 (the energization angle switching unit 120) rapidly sets the energization angle θ to 90°.

According to this, after the operation mode is switched from the one-phase excitation mode to the one-two-phase excitation mode, the energization angle θ is changed in a stepwise manner in the one-two-phase excitation mode, so that the speed of decreasing the rotational speed of the rotor 22 can be made slow.

Figure 11:
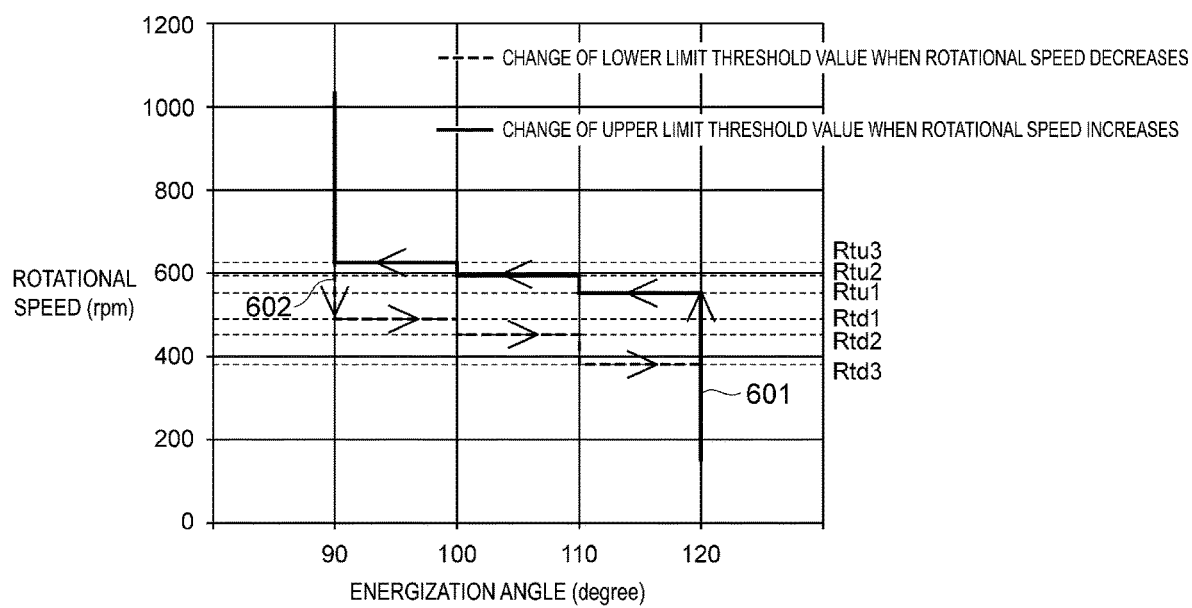
FIG. 11 is a diagram illustrating another example of the method for setting the energization angle θ according to Embodiment 3.

FIG. 11 is a diagram illustrating another example of the method for setting the energization angle θ according to Embodiment 3.

In FIG. 11, the horizontal axis represents the energization angle θ [°], and the vertical axis represents the rotational speed [rpm] of the rotor 22 of the two-phase stepping motor 20. Further, a reference sign 601 represents a change in the upper limit threshold value Rtu when the rotational speed increases, and a reference sign 602 represents a change in the lower limit threshold value Rtd when the rotational speed decreases. In the present example, the lower limit threshold value Rtd is set for each energization angle θ until the rotational speed decreases and the energization angle θ is changed from 90° to 120°, and the upper limit threshold value Rtu is set for each energization angle θ until the rotational speed increases and the energization angle θ is changed from 120° to 90°.

As illustrated in FIG. 11, in addition to changing the energization angle from 90° to a value larger than 90° (for example, 120°) in a stepwise manner according to a decrease in the rotational speed of the rotor 22 in a state of the energization angle being set to 90°, the control unit 11 may change the energization angle from a value larger than 90° to 90° in a stepwise manner according to an increase in the rotational speed of the rotor 22 in a state of the energization angle being set to a value larger than 90°.

In Embodiment 3, as determination values of the rotational speed for switching the energization angle θ, for example, as illustrated in FIG. 11, a plurality of upper limit threshold values Rtu1 to Rtu3 and a plurality of lower limit threshold values Rtd1 to Rtd3 are set.

The upper limit threshold values Rtu1 and Rtu2 are threshold values of the rotational speed for switching (decreasing) the energization angle θ in a stepwise manner in the one-two-phase excitation mode, and the upper limit threshold value Rtu3 is a threshold value of the rotational speed for switching the operation mode from the one-two-phase excitation mode to the one-phase excitation mode.

For example, as illustrated in FIG. 11, in a state of driving the two-phase stepping motor 20 in the one-two-phase excitation mode with the energization angle θ=120°, when the rotational speed of the rotor 22 of the two-phase stepping motor 20 becomes equal to or larger than the upper limit threshold value Rtu1, the control unit 11 (the energization angle switching unit 120) sets the energization angle θ to 110° from 120° to drive the two-phase stepping motor 20 in the one-two-phase excitation mode.

Next, as illustrated in FIG. 11, in a state of driving the two-phase stepping motor 20 in the one-two-phase excitation mode with the energization angle θ=110°, when the rotational speed of the rotor 22 of the two-phase stepping motor 20 becomes equal to or larger than the upper limit threshold value Rtu2 (>Rtu1), the control unit 11 (the energization angle switching unit 120) sets the energization angle θ to 100° from 110° to drive the two-phase stepping motor 20 in the one-two-phase excitation mode.

Further, as illustrated in FIG. 11, in a state of driving the two-phase stepping motor 20 in the one-two-phase excitation mode with the energization angle θ=100°, when the rotational speed of the rotor 22 of the two-phase stepping motor 20 becomes equal to or larger than the upper limit threshold value Rtu3 (>Rtu2), the control unit 11 (the energization angle switching unit 120) sets the energization angle θ to 90° from 100° to drive the two-phase stepping motor 20 in the one-phase excitation mode.

In switching from the one-phase excitation mode to the one-two-phase excitation mode, as in FIG. 10 described above, the energization angle θ is switched in order of 90°, 100°, 110°, and 120° according to a decrease in the rotational speed of the rotor 22 of the two-phase stepping motor 20.

Note that, regarding the upper limit threshold values Rtu1 to Rtu3 and the lower limit threshold values Rtd1 to Rtd3, an appropriate value is set according to the set value of the energization angle θ.

For example, when the energization angle θ is set to 90°, the lower limit threshold value Rtd1 is set, when the energization angle θ is set to 100°, the upper limit threshold value Rtu3 and the lower limit threshold value Rtd2 are set, when the energization angle θ is set to 110°, the upper limit threshold value Rtu2 and the lower limit threshold value Rtd3 are set, and when the energization angle θ is set to 120°, the upper limit threshold value Rtu1 is set.

According to this, since the energization angle θ is changed in a stepwise manner in the one-two-phase excitation mode after the operation mode is switched from the one-phase excitation mode to the one-two-phase excitation mode, the speed of decreasing the rotational speed of the rotor 22 can be made slow, and since the energization angle θ is changed in a stepwise manner when the operation mode is switched from the one-two-phase excitation mode to the one-phase excitation mode, the speed of increasing the rotational speed of the rotor 22 can be made slow.

Figure 12:
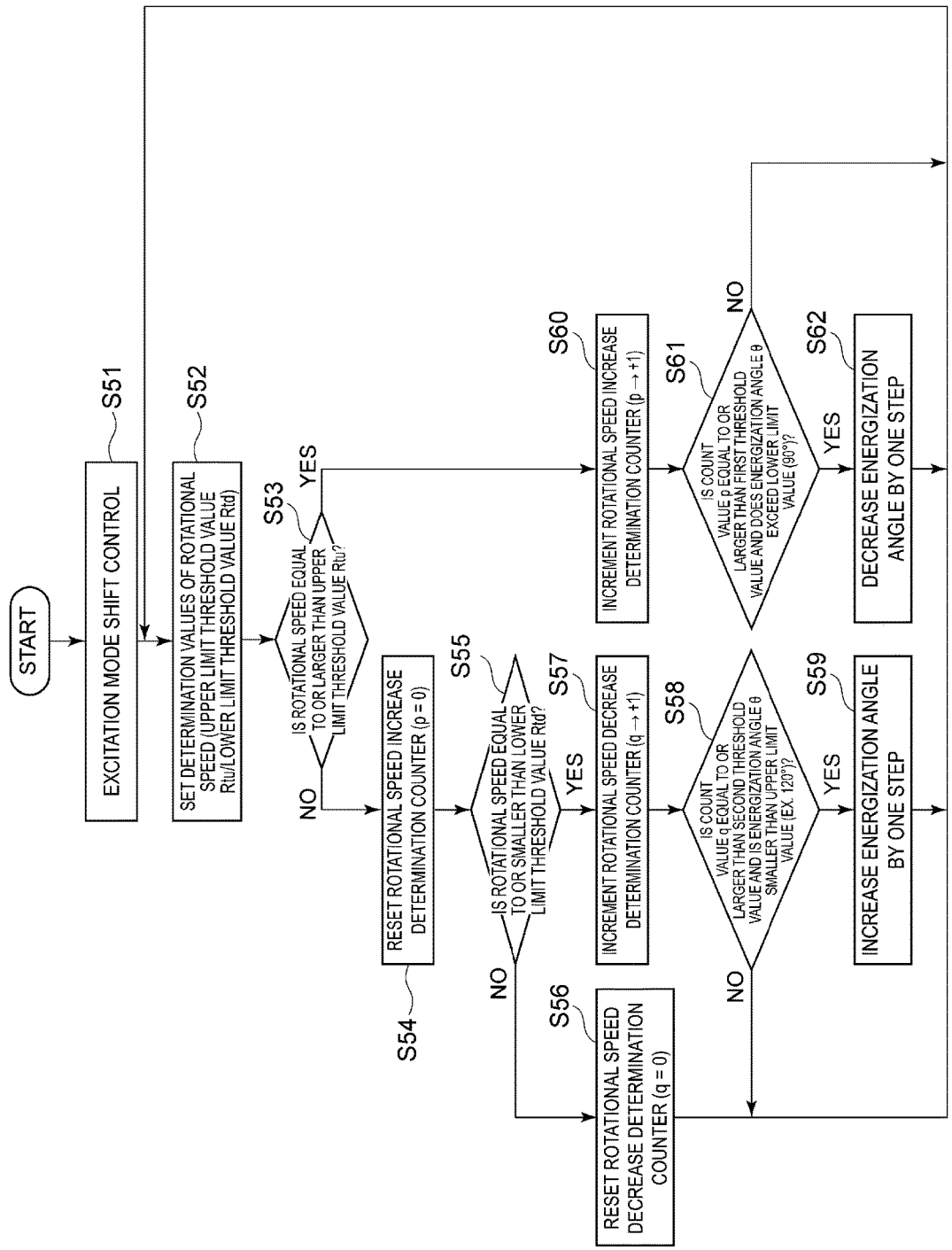
FIG. 12 is a flowchart illustrating a procedure of the method for setting the energization angle θ according to Embodiment 3.

FIG. 12 is a flowchart illustrating a procedure of a method for setting the energization angle θ according to Embodiment 3.

This figure illustrates a specific processing procedure for achieving the method for setting the energization angle θ illustrated in FIG. 11.

In FIG. 12, first, the motor drive control device 10 starts drive control (excitation mode shift control) of the two-phase stepping motor 20 when a drive instruction of the two-phase stepping motor 20 is input from an external host device after power is turned on, for example (step S51).

Next, the motor drive control device 10 sets the upper limit threshold value Rtu and the lower limit threshold value Rtd as determination values of the rotational speed corresponding to the energization angle θ at that time (step S52). For example, when the energization angle θ is set to 110°, the motor drive control device 10 sets the upper limit threshold value Rtu2 and the lower limit threshold value Rtd3 as the determination values of the rotational speed.

Next, the energization angle switching unit 120 determines whether or not the rotational speed of the rotor 22 of the two-phase stepping motor 20 is equal to or larger than the upper limit threshold value Rtu set in immediately preceding step S52 (step S53). When the rotational speed is not equal to or larger than the upper limit threshold value Rtu (step S53: NO), the energization angle switching unit 120 resets the count value p of the rotational speed increase determination counter 121 (step S54).

Next, the energization angle switching unit 120 determines whether or not the rotational speed of the rotor 22 of the two-phase stepping motor 20 is equal to or smaller than the lower limit threshold value Rtd set in step S52 (step S55). When the rotational speed is not equal to or smaller than the lower limit threshold value Rtd (step S55: NO), the energization angle switching unit 120 resets the count value q of the rotational speed decrease determination counter 122 (step S56). Thereafter, the motor drive control device 10 returns to step S52.

On the other hand, when the rotational speed is equal to or smaller than the lower limit threshold value Rtd (step S55: YES), the energization angle switching unit 120 increments the count value q of the rotational speed decrease determination counter 122 (step S57). Next, the energization angle switching unit 120 determines whether or not the count value q of the rotational speed decrease determination counter 122 is equal to or larger than the second threshold value, and whether or not the energization angle θ is smaller than an upper limit value (for example, 120°) (step S58).

When the count value q of the rotational speed decrease determination counter 122 is not equal to or larger than the second threshold value or the energization angle θ is not smaller than the upper limit value (step S58: NO), the motor drive control device 10 returns to step S52.

On the other hand, when the count value q of the rotational speed decrease determination counter 122 is equal to or larger than the second threshold value and the energization angle θ is smaller than the upper limit value (step S58: YES), the energization angle switching unit 120 increases the energization angle θ toward the upper limit value (120°) by one step (step S59). For example, when the energization angle θ is 100°, the energization angle switching unit 120 sets the energization angle θ to 110°. Thereafter, the motor drive control device 10 returns to step S52, sets the upper limit threshold value Rtu and the lower limit threshold value Rtd corresponding to the newly set energization angle θ, and performs processing of step S53 and the following steps.

In step S53, when the rotational speed is equal to or larger than the upper limit threshold value Rtu (step S53: YES), the energization angle switching unit 120 increments the count value p of the rotational speed increase determination counter 121 (step S60). Next, the energization angle switching unit 120 determines whether or not the count value p of the rotational speed increase determination counter 121 is equal to or larger than the first threshold value, and whether or not the energization angle θ exceeds the lower limit value (90°) (step S61).

When the count value p of the rotational speed increase determination counter 121 is not equal to or larger than the first threshold value or the energization angle θ does not exceed the lower limit value, that is, θ is equal to 90° (step S61: NO), the motor drive control device 10 returns to step S52.

On the other hand, when the count value p of the rotational speed increase determination counter 121 is equal to or larger than the first threshold value and the energization angle θ exceeds the lower limit value (step S61: YES), the energization angle switching unit 120 reduces the energization angle θ toward the lower limit value (90°) by one step (step S62). For example, when the energization angle θ is 100°, the energization angle switching unit 120 sets the energization angle θ to 90°.

Thereafter, the motor drive control device 10 returns to step S52, sets the upper limit threshold value Rtu and the lower limit threshold value Rtd corresponding to the newly set energization angle θ, and repeatedly performs the processing of step S53 and the following steps.

According to the switching technique of the energization angle according to Embodiment 3, since the energization angle θ is changed in a stepwise manner, the rotational speed of the rotor 22 can be slowly changed, and more stable driving of the two-phase stepping motor 20 can be achieved.

Expansion of Embodiment

The invention conceived by the present inventors has been specifically described above based on the embodiments. However, the present invention is not limited to the embodiments, and of course, various modifications can be made without departing from the gist of the present invention.

For example, in the two-phase stepping motor 20 in the embodiments described above, a case of the number of poles of the rotor 22 being two has been exemplified, but the number of poles of the rotor 22 is not particularly limited.

The motor unit 1 according to the embodiments described above is not limited to have the configuration disclosed in FIG. 1. For example, the drive unit 12 may include other circuits such as a current detection circuit for detecting coil currents of the coils 21A and 21B, in addition to the motor drive unit 13 described above.

In addition, the flowcharts described above are examples for the purpose of explaining operations, and the embodiments are not limited to these flowcharts. That is, the steps illustrated in each drawing of the flowcharts are specific examples, and the embodiments are not limited to this procedure. For example, the order of processes may be partially changed, another process may be inserted between individual processes, or part of the processes may be performed in parallel.

Additionally, in the above-described embodiments, the case of allowing the control unit 11 to monitor the rotational speed of the rotor 22 as a rotational state of the rotor 22 and to set the energization angle θ such that the energization angle θ decreases as the rotational speed of the rotor 22 increases has been described, but the rotational state of the rotor 22 is not limited to the rotational speed. For example, the control unit 11 may monitor the load of the rotor 22 as the rotational state of the rotor 22, and may set the energization angle θ such that the energization angle θ decreases as the load of the rotor 22 decreases. A specific example of a case of monitoring the load of the rotor 22 and setting the energization angle θ according to the load will be described below.

Figure 13:
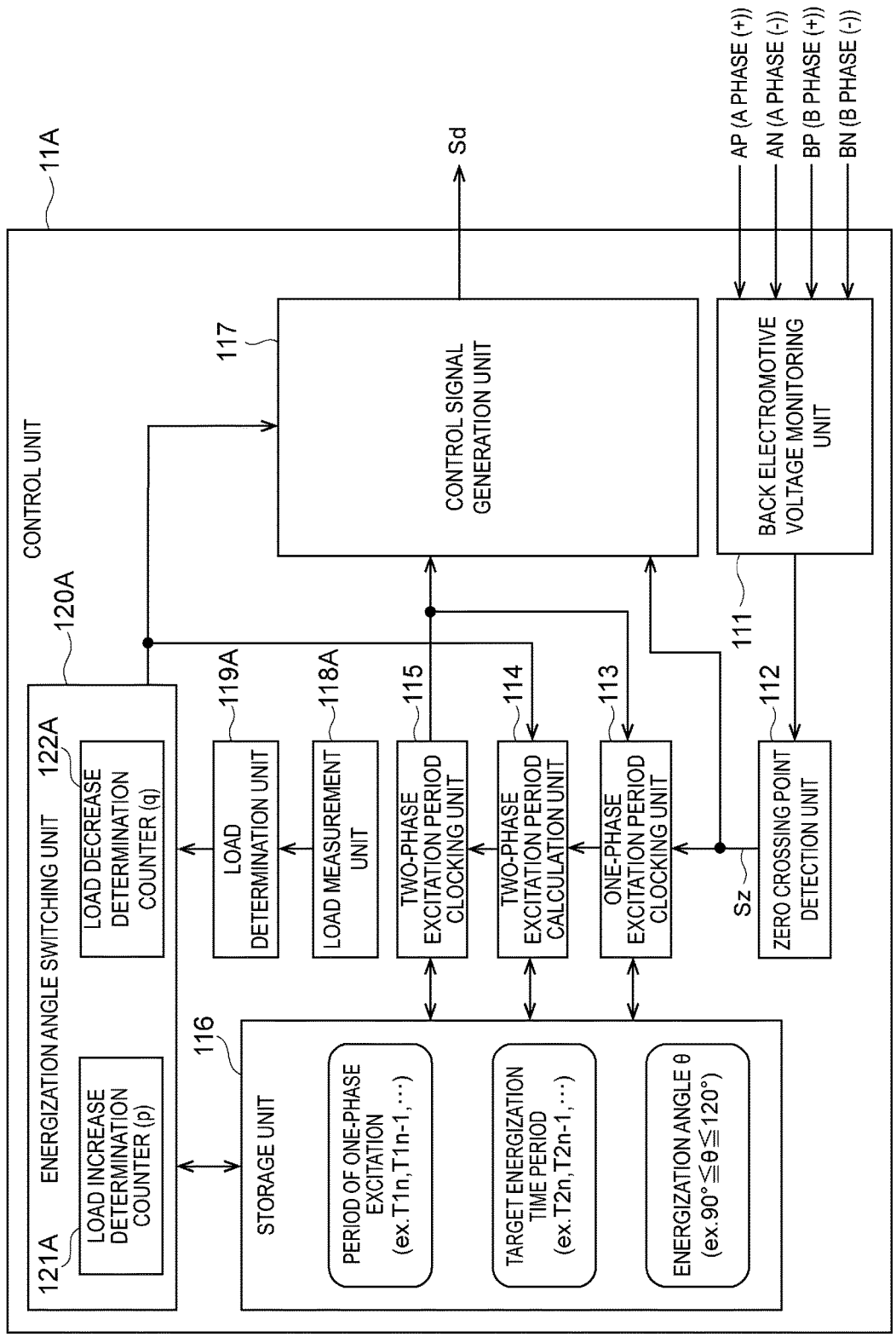
FIG. 13 is a diagram illustrating a functional block configuration of a control unit for setting the energization angle θ according to a load of a rotor.

FIG. 13 is a diagram illustrating a functional block configuration of a control unit 11A setting the energization angle θ according to the load of the rotor 22.

As illustrated in FIG. 13, the control unit 11A includes a load measurement unit 118A, a load determination unit 119A, a load increase determination counter 121A, and a load decrease determination counter 122A, instead of (or in addition to) the rotational speed measurement unit 118, the rotational speed determination unit 119, the rotational speed increase determination counter 121, and the rotational speed decrease determination counter 122 in the control unit 11 illustrated in FIG. 7.

The load measurement unit 118A is a functional unit for measuring the load of the rotor 22 of the two-phase stepping motor 20. The load measurement unit 118A measures the magnitudes of currents flowing into the A-phase coil 21A and the B-phase coil 21B of the two-phase stepping motor 20, for example, and uses the current value as a measurement value of the load of the rotor 22.

The load determination unit 119A is a functional unit for comparing the measurement value of the load of the rotor 22 of the two-phase stepping motor 20 with a determination value of the load for switching the energization angle θ. The load determination unit 119A is a functional unit for comparing the measurement value of the load by the load measurement unit 118A with an upper limit threshold value Ltu and a lower limit threshold value Ltd of the load. For example, when the measurement value of the load becomes equal to or larger than the upper limit threshold value Ltu, the load determination unit 119A provides a signal indicating the fact to the energization angle switching unit 120A. Additionally, when the measurement value of the load becomes equal to or smaller than the lower limit threshold value Ltd, the load determination unit 119A provides a signal indicating the fact to the energization angle switching unit 120A.

The energization angle switching unit 120A outputs an operation mode signal instructing an energization angle θ, that is, an operation mode, according to the signal from the load determination unit 119A.

For example, in a state of performing the energization switching control in the one-two-phase excitation mode (for example, the energization angle θ=120°), when a signal indicating that the measurement value of the load has become equal to or smaller than the lower limit threshold value Ltd is output from the load determination unit 119A, the energization angle switching unit 120 outputs an operation mode signal instructing the one-phase excitation mode (the energization angle θ=90°) to the two-phase excitation period calculation unit 114.

Additionally, in a state of performing the energization switching control in the one-phase excitation mode (the energization angle θ=90°), when an operation mode signal indicating that the measurement value of the load has become equal to or larger than the upper limit threshold value Ltu is output from the load determination unit 119A, the energization angle switching unit 120A outputs an operation mode signal instructing the one-two-phase excitation mode (for example, the energization angle θ=120°) to the two-phase excitation period calculation unit 114.

According to the control unit 11A, it is possible to enhance the stability of drive control of the two-phase stepping motor against the load fluctuation, as with the case of setting the energization angle θ according to the rotational speed.

The switching of the operation mode by the control unit 11A is preferably performed when the increase and the decrease of the load with respect to the upper limit threshold value Ltu and the lower limit threshold value Ltd are detected a plurality of times, respectively, as in the case of monitoring the rotational speed. For example, as illustrated in FIG. 13, the energization angle switching unit 120A may include a load increase determination counter 121A and a load decrease determination counter 122A, count the number of times the load of the rotor 22 becomes equal to or larger than the upper limit threshold value Ltu by using the load increase determination counter 121A, count the number of times the load of the rotor 22 becomes equal to or smaller than the lower limit threshold value Ltd by using the load decrease determination counter 122A, and switch the operation mode based on the count values of these counters.

Specifically, the energization angle switching unit 120A increments the load increase determination counter 121A (+1) when the signal indicating that the measurement value of the load has become equal to or larger than the upper limit threshold value Ltu is output from the load determination unit 119A, and resets the load increase determination counter 121A when the measurement value of the load becomes smaller than the upper limit threshold value Ltu.

Additionally, the energization angle switching unit 120A increments the load decrease determination counter 122A (+1) when the signal indicating that the measurement value of the load has become equal to or smaller than the lower limit threshold value Ltd is output from the load determination unit 119A, and resets the load decrease determination counter 122A when the measurement value of the load is larger than the lower limit threshold value Ltd.

The energization angle switching unit 120A outputs an operation mode signal instructing the one-two-phase excitation mode (for example, the energization angle θ120°) when the count value by the load increase determination counter 121A becomes equal to or larger than a first threshold value (for example, an integer equal to or larger than 2). Additionally, the energization angle switching unit 120A outputs an operation mode signal instructing the one-phase excitation mode (the energization angle θ=90°) when the count value by the load decrease determination counter 122A becomes equal to or larger than a second threshold value (for example, an integer equal to or larger than 2).

Note that the first threshold value and the second threshold value may be the same value, or may be different values. Information about the first threshold value and the second threshold value is, for example, stored in advance in the storage unit 116.

In this way, by using the load increase determination counter 121A and the load decrease determination counter 122A, it is possible to prevent switching of the operation mode according to the instantaneous fluctuation of the load of the rotor 22.

REFERENCE SIGNS LIST

1 . . . Motor unit, 10 . . . Motor drive control device, 11, 11A . . . Control unit, 12 . . . Drive unit, 13 . . . Motor drive unit, 20 . . . Two-phase stepping motor, 21 . . . Coil, 21A . . . A-phase coil, 21B . . . B-phase coil, 22 . . . Rotor, 22N . . . N pole, 22S . . . S pole, 111 . . . Back electromotive voltage monitoring unit, 112 . . . Zero crossing point detection unit, 113 . . . One-phase excitation period clocking unit, 114 . . . Two-phase excitation period calculation unit, 115 . . . Two-phase excitation period clocking unit, 116 . . . Storage unit, 117 . . . Control signal generation unit, 118 . . . Rotational speed measurement unit, 118A . . . Load measurement unit, 119 . . . Rotational speed determination unit, 119A . . . Load determination unit, 120, 120A . . . Energization angle switching unit, 121 . . . Rotational speed increase determination counter, 121A . . . Load increase determination counter, 122 . . . Rotational speed decrease determination counter, 122A . . . Load decrease determination counter, Sd . . . Control signal, Sz . . . Detection signal, T1$n$ . . . Period of one-phase excitation, T2$n$ . . . Target energization time period (period of two-phase excitation), AP . . . Terminal at the positive electrode side of the A-phase coil, AN . . . Terminal at the negative electrode side of the A-phase coil, BP . . . Terminal at the positive electrode side of the B-phase coil, BN . . . Terminal at the negative electrode side of the B-phase coil, Rtu, Rtu1 to Rtu3, Ltu . . . Upper limit threshold value, Rtd, Rtd1 to Rtd3, Ltd . . . Lower limit threshold value.

The invention claimed is:

1. A motor drive control device comprising:
a control unit configured to monitor a rotational state of a rotor of a two-phase stepping motor, set an energization angle representing a magnitude of an electric angle for continuously energizing, of coils of two phases of the two-phase stepping motor, a coil of one phase in one direction based on the rotational state of the rotor, and generate a control signal for controlling driving of the two-phase stepping motor based on the set energization angle; and
a drive unit configured to drive the coils of two phases based on the control signal, wherein
the control unit monitors a rotational speed of the rotor as the rotational state of the rotor, and sets the energization angle such that the energization angle decreases as the rotational speed of the rotor increases, wherein
the control unit has, as operation modes, a one-two-phase excitation mode of alternately repeating one-phase excitation of exciting the coil for one phase of the coils of two phases, and two-phase excitation of exciting the coils for two phases of the coils of two phases, and a one-phase excitation mode of exciting the coil for one phase of the coils of two phases, and
the control unit sets the energization angle to 90° and selects the one-phase excitation mode when the rotational speed of the rotor becomes equal to or larger than an upper limit threshold value, and sets the energization angle to a value larger than 90° and selects the one-two-phase excitation mode when the rotational speed of the rotor becomes equal to or smaller than a lower limit threshold value smaller than the upper limit threshold value.

2. The motor drive control device according to claim 1, wherein in a state of the energization angle being set to 90°, the control unit changes the energization angle from 90° to the value larger than 90° with an elapse of time, when the rotational speed of the rotor becomes equal to or smaller than the lower limit threshold value.

3. The motor drive control device according to claim 2, wherein in a state of the energization angle being set to the value larger than 90°, the control unit changes the energization angle from the value larger than 90° to 90° with an elapse of time, when the rotational speed of the rotor becomes equal to or larger than the upper limit threshold value.

4. The motor drive control device according to claim 1, wherein in a state of the energization angle being set to 90°, the control unit changes the energization angle from 90° to the value larger than 90° in a stepwise manner according to a decrease in the rotational speed of the rotor.

5. The motor drive control device according to claim 4, wherein in a state of the energization angle being set to the value larger than 90°, the control unit changes the energization angle from the value larger than 90° to 90° in a stepwise manner according to an increase in the rotational speed of the rotor when the rotational speed of the rotor becomes equal to or larger than the upper limit threshold value.

6. A motor unit comprising:
the motor drive control device according to claim 1; and
the two-phase stepping motor.

7. A motor drive control device comprising:
a control unit configured to monitor a rotational state of a rotor of a two-phase stepping motor, set an energization angle representing a magnitude of an electric angle for continuously energizing, of coils of two phases of the two-phase stepping motor, a coil of one phase in one direction based on the rotational state of the rotor, and generate a control signal for controlling driving of the two-phase stepping motor based on the set energization angle; and a drive unit configured to drive the coils of two phases based on the control signal, wherein the control unit monitors a load of the rotor as the rotational state of the rotor, and sets the energization angle such that the energization angle decreases as the load of the rotor decreases, wherein the control unit has, as operation modes, a one-two-phase excitation mode of alternately repeating one-phase excitation of exciting the coil for one phase of the coils of two phases, and two-phase excitation of exciting the coils for two phases of the coils of two phases, and a one-phase excitation mode of exciting the coil for one phase of the coils of two phases, and the control unit sets the energization angle to 90° and selects the one-phase excitation mode when the measurement value of the load of the rotor becomes equal to or smaller than a lower limit threshold value, and sets the energization angle to a value larger than 90° and selects the one-two-phase excitation mode when the measurement value of the load of the rotor becomes equal to or larger than an upper limit threshold value.

8. A motor unit comprising:
the motor drive control device according to claim 7; and
the two-phase stepping motor.

9. A motor drive control method for controlling driving of a two-phase stepping motor by a motor drive control device, the motor drive control method comprising:

a first step of monitoring, by the motor drive control device, a rotational state of a rotor of the two-phase stepping motor;

a second step of setting, by the motor drive control device, an energization angle representing a magnitude of an electric angle for continuously energizing, of coils of two phases of the two-phase stepping motor, a coil of one phase in one direction, based on the rotational state of the rotor;

a third step of generating, by the motor drive control device, a control signal for controlling driving of the two-phase stepping motor based on the energization angle set in the second step; and a fourth step of driving, by the motor drive control device, the coils of two phases based on the control signal, wherein the first step includes a step of monitoring a rotational speed of the rotor as the rotational state of the rotor, and the second step includes a fifth step of setting the energization angle such that the energization angle decreases as the rotational speed of the rotor increases, wherein the motor drive control device has, as operation modes, a one-two-phase excitation mode of alternately repeating one-phase excitation of exciting the coil for one phase of the coils of two phases, and two-phase excitation of exciting the coils for two phases of the coils of two phases, and a one-phase excitation mode of exciting the coil for one phase of the coils of two phases, and the fifth step includes a step of setting the energization angle to 90° and selecting the one-phase excitation mode when the rotational speed of the rotor becomes equal to or larger than an upper limit threshold value, and a step of setting the energization angle to a value larger than 90° and selecting the one-two-phase excitation mode when the rotational speed of the rotor becomes equal to or smaller than a lower limit threshold value smaller than the upper limit threshold value.

* * * * *